US012639971B2

(12) United States Patent
Vankina et al.

(10) Patent No.: US 12,639,971 B2
(45) Date of Patent: May 26, 2026

(54) MACHINE LEARNING BASED SYSTEMS AND METHODS FOR DATA EXTRACTION FROM FINANCIAL STATEMENTS

(71) Applicant: HIGHRADIUS CORPORATION, Houston, TX (US)

(72) Inventors: Lohit Vankina, Hyderabad (IN); Nilotpal Sarkar, Hyderabad (IN); Niladri Sen, Hyderabad (IN); Gummadi Sai Dheeraj, Hyderabad (IN); Ansumun Gouda, Hyderabad (IN); Pratyush Amrit, Hyderabad (IN); Sumit Gupta, Hyderabad (IN)

( * ) Notice: Subject to any disclaimer, the term of this patent is extended or adjusted under 35 U.S.C. 154(b) by 243 days.

(21) Appl. No.: 18/396,772

(22) Filed: Dec. 27, 2023

(65) Prior Publication Data

US 2025/0218205 A1     Jul. 3, 2025

(51) Int. Cl.
*G06V 30/412*     (2022.01)
*G06V 10/82*     (2022.01)
*G06V 30/19*     (2022.01)
*G06V 30/414*     (2022.01)

(52) U.S. Cl.
CPC ............ *G06V 30/412* (2022.01); *G06V 10/82* (2022.01); *G06V 30/19147* (2022.01); *G06V 30/414* (2022.01)

(58) Field of Classification Search
CPC ................. G06V 30/412; G06V 10/82; G06V 30/19147; G06V 30/414; G06V 30/10; G06V 30/19173; G06V 30/416; G06V 30/413; G06V 30/1448; G06V 30/1475;
G06V 30/42; G06V 10/25; G06V 30/19107; G06N 3/044; G06N 3/045; G06N 3/08; G06Q 40/12; G06F 40/30; G06F 16/93; G06F 40/177; G06F 16/3329; G06F 40/103; G06F 40/106; G06F 40/205
See application file for complete search history.

(56) References Cited

U.S. PATENT DOCUMENTS

| | | | | |
|---|---|---|---|---|
| 11,087,123 B2 * | 8/2021 | Chitta | .................... | G06V 10/82 |
| 11,281,928 B1 * | 3/2022 | Hoehne | ................ | G06V 30/418 |
| 11,625,934 B2 * | 4/2023 | Tiyyagura | ............. | G06F 40/295 |
| | | | | 382/112 |

(Continued)

*Primary Examiner* — Michael S Osinski
(74) *Attorney, Agent, or Firm* — Jason C. Cameron

(57)     ABSTRACT

A machine learning based computing method for extracting data from electronic documents, is disclosed. The machine learning based computing method includes steps of: receiving the electronic documents from data sources; converting formats of the electronic documents into first images associated with the electronic documents; classifying the first images associated with the electronic documents as second images including tabular data, and third images including non-tabular data, based on a CNN based machine learning model; determining tabular regions in tabular data associated with the second images by identifying bounding box coordinates indicating tabular regions in tabular data, based on a YOLO architecture based machine learning model; extracting first data from the tabular regions; extracting second data from non-tabular regions; and providing an output of the first data and the second data to second users on a user interface associated with electronic devices.

20 Claims, 18 Drawing Sheets

(56) References Cited

U.S. PATENT DOCUMENTS

| | | | | |
|---|---|---|---|---|
| 11,630,956 B2 * | 4/2023 | Yaramada | G06F 40/295 | |
| | | | 704/9 | |
| 11,823,477 B1 * | 11/2023 | Ramezani | G06V 30/412 | |
| 12,046,063 B2 * | 7/2024 | Berestovsky | G06V 30/413 | |
| 12,197,897 B2 * | 1/2025 | Lee | G06F 8/60 | |
| 12,205,391 B2 * | 1/2025 | Lanin | G06V 30/19107 | |
| 12,217,523 B2 * | 2/2025 | Chatzistamatiou | | |
| | | | G06V 30/1463 | |
| 12,400,467 B2 * | 8/2025 | Semenov | G06V 30/414 | |
| 2014/0369602 A1 * | 12/2014 | Meier | G06V 30/412 | |
| | | | 382/182 | |
| 2018/0276462 A1 * | 9/2018 | Davis | G06V 30/15 | |
| 2019/0138509 A1 * | 5/2019 | Von Rickenbach | | |
| | | | G06F 11/0727 | |
| 2019/0171872 A1 * | 6/2019 | Northrup | G06F 16/284 | |
| 2020/0175095 A1 * | 6/2020 | Morariu | G06F 40/117 | |
| 2021/0248420 A1 * | 8/2021 | Zhong | G06V 10/82 | |
| 2022/0027611 A1 * | 1/2022 | Yu | G06V 10/806 | |
| 2022/0044011 A1 * | 2/2022 | Shanmugasundaram | | |
| | | | G06F 40/216 | |
| 2022/0230013 A1 * | 7/2022 | Krishnamurthy | G06N 3/096 | |
| 2022/0318545 A1 * | 10/2022 | Poff | G06V 30/412 | |
| 2022/0319217 A1 * | 10/2022 | Paliwal | G06V 10/82 | |
| 2023/0065915 A1 * | 3/2023 | Berestovsky | G06F 18/22 | |
| 2023/0095673 A1 * | 3/2023 | Dharmasiri | G06V 10/454 | |
| | | | 382/157 | |
| 2023/0169101 A1 * | 6/2023 | Yuan | G06N 3/045 | |
| | | | 707/722 | |
| 2023/0206671 A1 * | 6/2023 | Lanin | G06V 30/412 | |
| | | | 382/175 | |
| 2023/0252231 A1 * | 8/2023 | Kotwal | G06V 10/82 | |
| | | | 382/156 | |
| 2023/0289378 A1 * | 9/2023 | Jadhav | G06F 40/103 | |
| 2023/0401877 A1 * | 12/2023 | Srinivasa | G06V 30/1448 | |
| 2024/0062568 A1 * | 2/2024 | Khan | G06V 30/10 | |
| 2024/0153299 A1 * | 5/2024 | Pillai | G06F 40/103 | |
| 2024/0160953 A1 * | 5/2024 | Manda | G06N 5/01 | |
| 2024/0221415 A1 * | 7/2024 | Kato | G06V 30/422 | |
| 2024/0249545 A1 * | 7/2024 | Marcheret | G06F 16/93 | |
| 2024/0281741 A1 * | 8/2024 | Wheelwright | G06Q 10/0637 | |
| 2025/0094839 A1 * | 3/2025 | Bajaj | G06N 5/022 | |
| 2025/0156955 A1 * | 5/2025 | Ramaswamy | G06Q 40/08 | |
| 2025/0200851 A1 * | 6/2025 | Wu | G06F 40/35 | |
| 2025/0342310 A1 * | 11/2025 | Aguirre | G06F 40/186 | |

* cited by examiner

100

104

Memory 202

Plurality of Subsystems 110

Document Acquisition Subsystem 210

Document Conversion Subsystem 212

Page Classification Subsystem 214

Table Region Determining Subsystem 216

Data Extraction Subsystem 218

Output Subsystem 220

Training Subsystem 222

System Bus 208

Storage Unit 206

Hardware Processor(s) 204

300

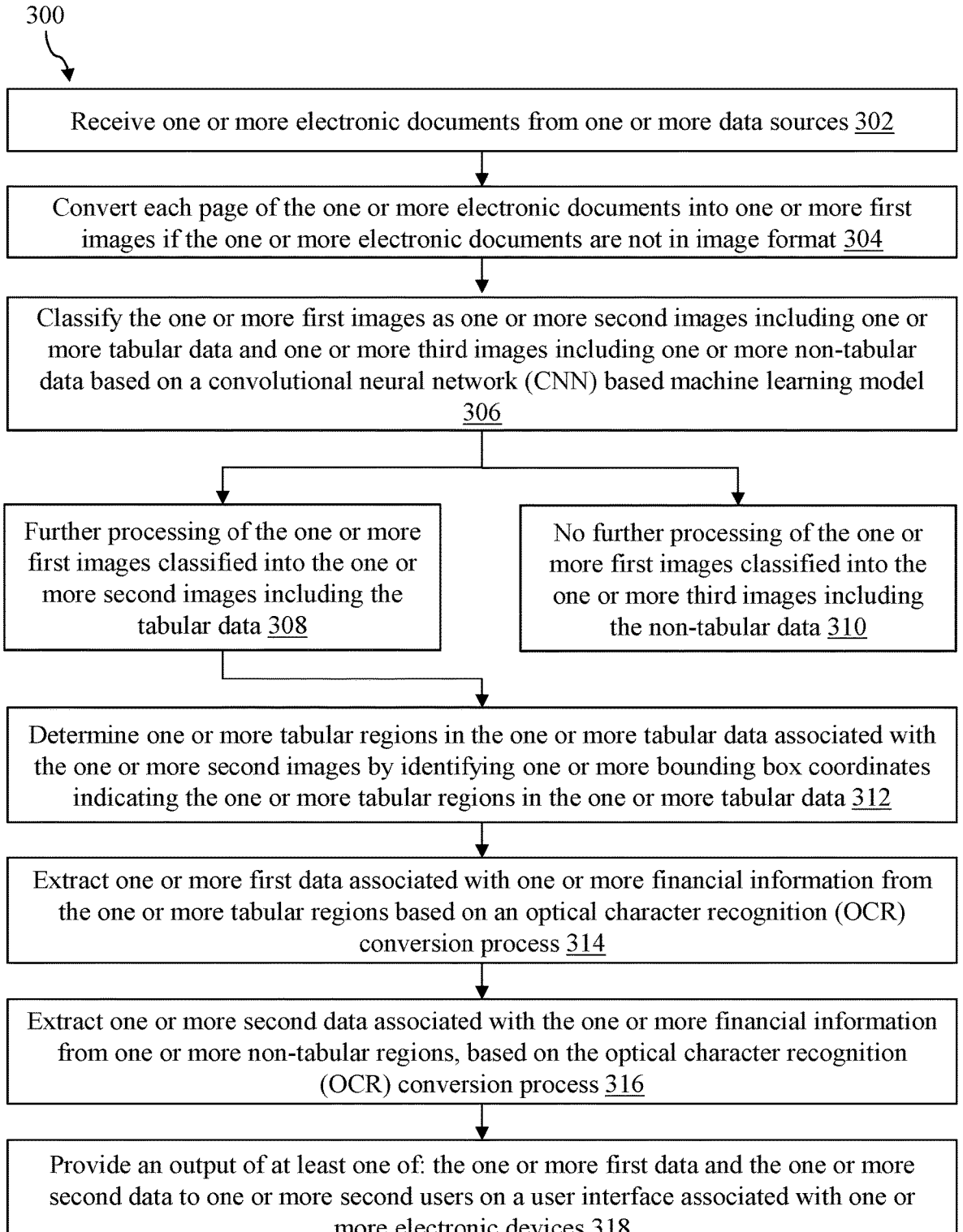

Receive one or more electronic documents from one or more data sources 302

Convert each page of the one or more electronic documents into one or more first images if the one or more electronic documents are not in image format 304

Classify the one or more first images as one or more second images including one or more tabular data and one or more third images including one or more non-tabular data based on a convolutional neural network (CNN) based machine learning model 306

Further processing of the one or more first images classified into the one or more second images including the tabular data 308

No further processing of the one or more first images classified into the one or more third images including the non-tabular data 310

Determine one or more tabular regions in the one or more tabular data associated with the one or more second images by identifying one or more bounding box coordinates indicating the one or more tabular regions in the one or more tabular data 312

Extract one or more first data associated with one or more financial information from the one or more tabular regions based on an optical character recognition (OCR) conversion process 314

Extract one or more second data associated with the one or more financial information from one or more non-tabular regions, based on the optical character recognition (OCR) conversion process 316

Provide an output of at least one of: the one or more first data and the one or more second data to one or more second users on a user interface associated with one or more electronic devices 318

FIG. 3

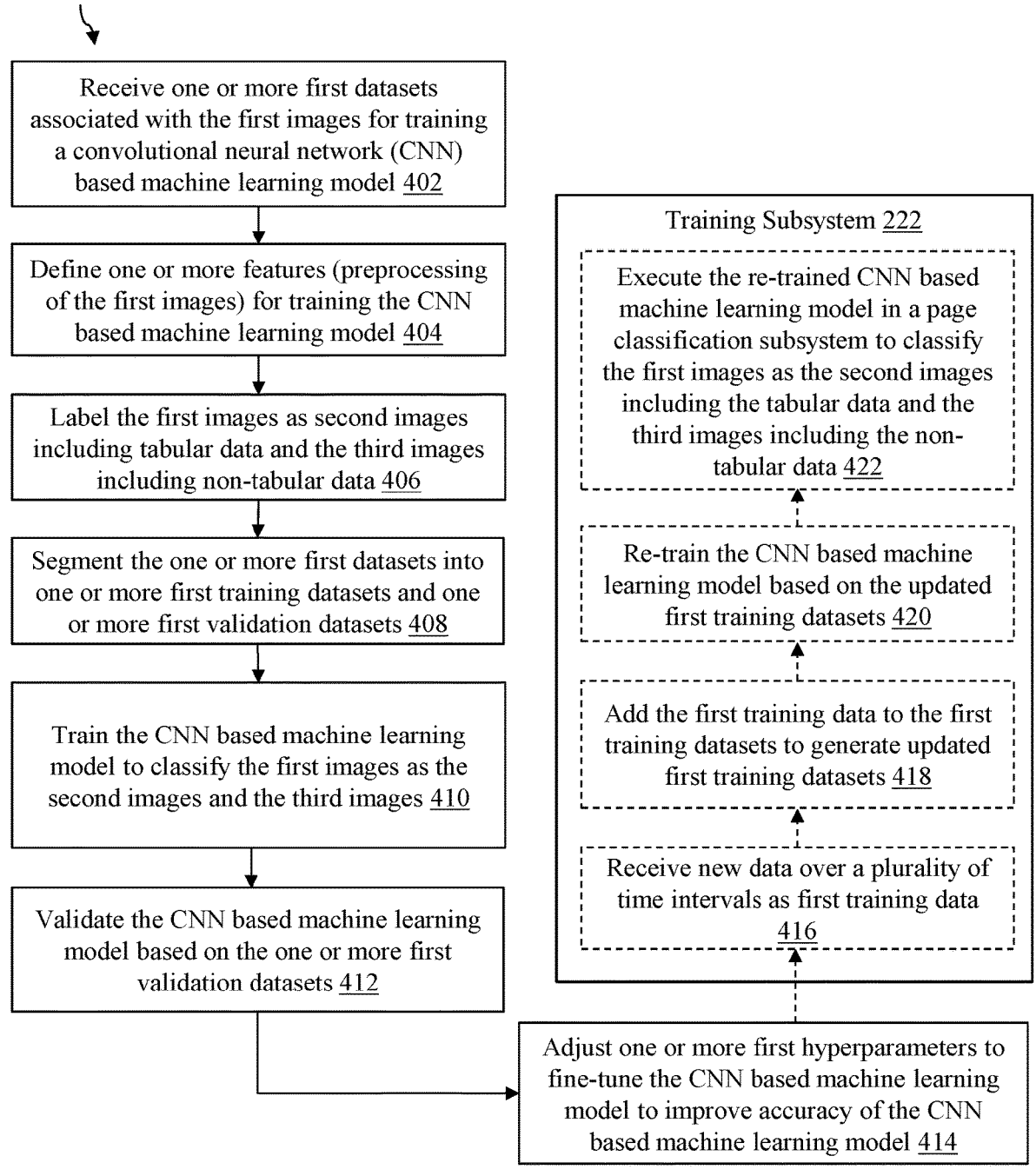

400

Receive one or more first datasets associated with the first images for training a convolutional neural network (CNN) based machine learning model 402

Define one or more features (preprocessing of the first images) for training the CNN based machine learning model 404

Label the first images as second images including tabular data and the third images including non-tabular data 406

Segment the one or more first datasets into one or more first training datasets and one or more first validation datasets 408

Train the CNN based machine learning model to classify the first images as the second images and the third images 410

Validate the CNN based machine learning model based on the one or more first validation datasets 412

Training Subsystem 222

Execute the re-trained CNN based machine learning model in a page classification subsystem to classify the first images as the second images including the tabular data and the third images including the non-tabular data 422

Re-train the CNN based machine learning model based on the updated first training datasets 420

Add the first training data to the first training datasets to generate updated first training datasets 418

Receive new data over a plurality of time intervals as first training data 416

Adjust one or more first hyperparameters to fine-tune the CNN based machine learning model to improve accuracy of the CNN based machine learning model 414

FIG. 4

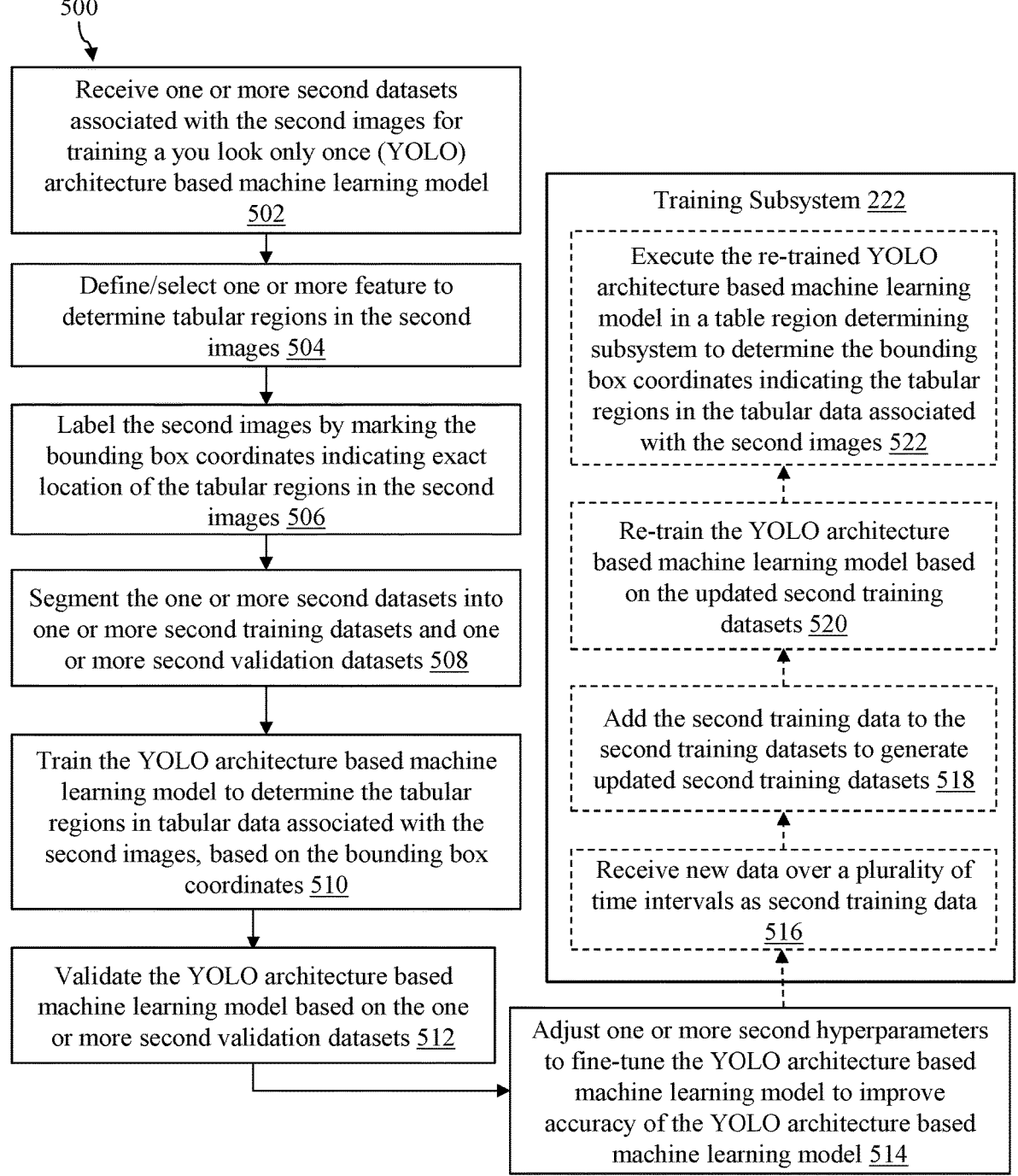

500

Receive one or more second datasets associated with the second images for training a you look only once (YOLO) architecture based machine learning model 502

Define/select one or more feature to determine tabular regions in the second images 504

Label the second images by marking the bounding box coordinates indicating exact location of the tabular regions in the second images 506

Segment the one or more second datasets into one or more second training datasets and one or more second validation datasets 508

Train the YOLO architecture based machine learning model to determine the tabular regions in tabular data associated with the second images, based on the bounding box coordinates 510

Validate the YOLO architecture based machine learning model based on the one or more second validation datasets 512

Training Subsystem 222

Execute the re-trained YOLO architecture based machine learning model in a table region determining subsystem to determine the bounding box coordinates indicating the tabular regions in the tabular data associated with the second images 522

Re-train the YOLO architecture based machine learning model based on the updated second training datasets 520

Add the second training data to the second training datasets to generate updated second training datasets 518

Receive new data over a plurality of time intervals as second training data 516

Adjust one or more second hyperparameters to fine-tune the YOLO architecture based machine learning model to improve accuracy of the YOLO architecture based machine learning model 514

Provide one or more first images associated with the one or more electronic documents to a CNN based machine learning model 602

604

606

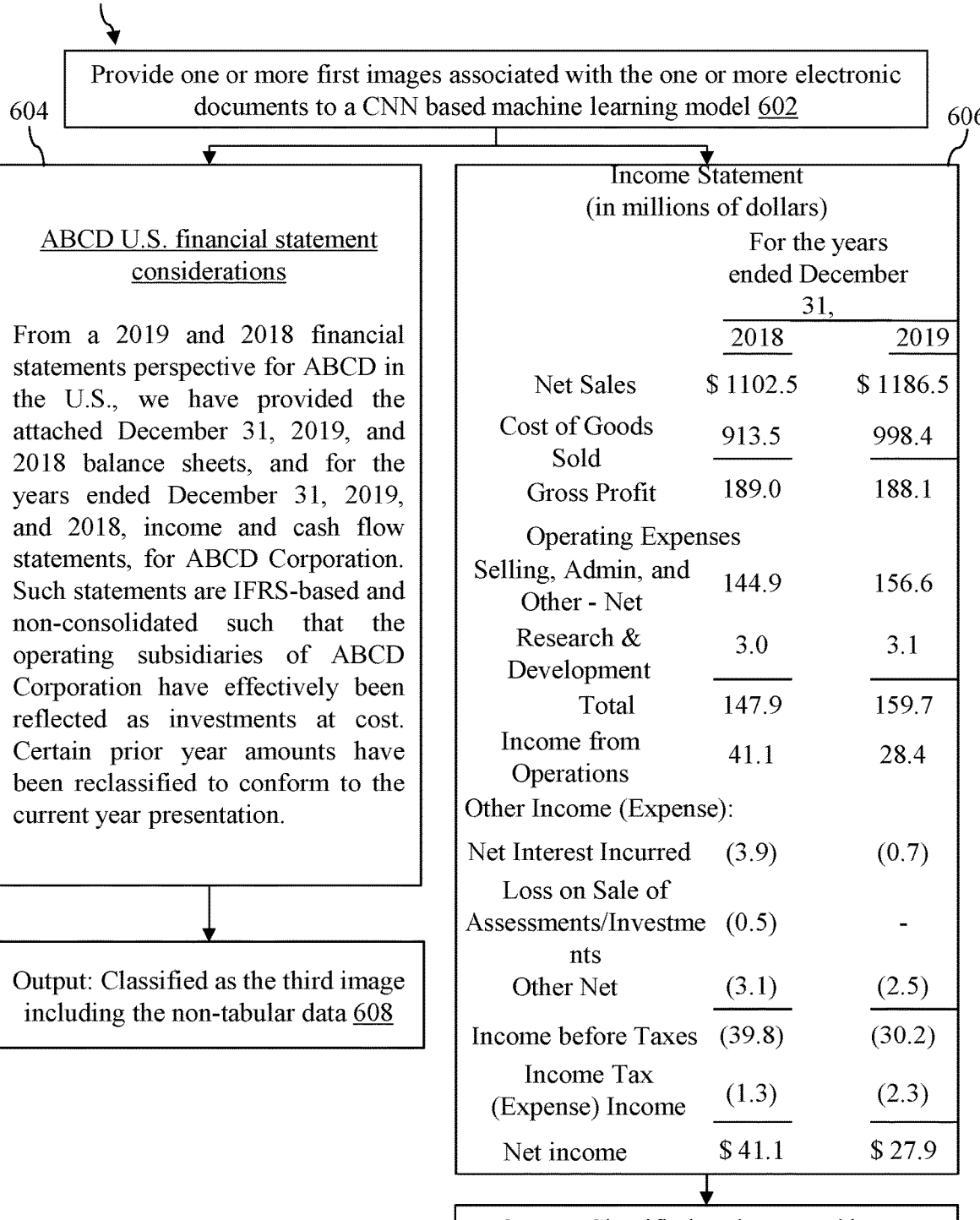

ABCD U.S. financial statement considerations

From a 2019 and 2018 financial statements perspective for ABCD in the U.S., we have provided the attached December 31, 2019, and 2018 balance sheets, and for the years ended December 31, 2019, and 2018, income and cash flow statements, for ABCD Corporation. Such statements are IFRS-based and non-consolidated such that the operating subsidiaries of ABCD Corporation have effectively been reflected as investments at cost. Certain prior year amounts have been reclassified to conform to the current year presentation.

Output: Classified as the third image including the non-tabular data 608

Income Statement
(in millions of dollars)

For the years ended December 31,

|  | 2018 | 2019 |
|---|---|---|
| Net Sales | $ 1102.5 | $ 1186.5 |
| Cost of Goods Sold | 913.5 | 998.4 |
| Gross Profit | 189.0 | 188.1 |
| Operating Expenses | | |
| Selling, Admin, and Other - Net | 144.9 | 156.6 |
| Research & Development | 3.0 | 3.1 |
| Total | 147.9 | 159.7 |
| Income from Operations | 41.1 | 28.4 |
| Other Income (Expense): | | |
| Net Interest Incurred | (3.9) | (0.7) |
| Loss on Sale of Assessments/Investments | (0.5) | - |
| Other Net | (3.1) | (2.5) |
| Income before Taxes | (39.8) | (30.2) |
| Income Tax (Expense) Income | (1.3) | (2.3) |
| Net income | $ 41.1 | $ 27.9 |

Output: Classified as the second image including the tabular data 610

| | | |
|---|---|---|
| Cash and Cash Equivalents | 8,773 | $ 10,260 |
| Total current liabilities | 105,392 | 105,718 |
| Non-current liabilities: | | |
| Term debt | 98,667 | 91,807 |
| Other non-current liabilities | 54,490 | 50,503 |
| Total non-current liabilities | 153,157 | 142,310 |
| Total liabilities | 258,549 | 248,028 |
| Commitments and Contingencies | | |
| Shareholder's Equity: | | |
| Common stock and additional paid-in capital, $0.00001 par value 50,400,000 shares authorized; 16,976,763 and 17,772,945 shares issued and outstanding, respectively | 50,779 | 45,174 |
| Retained earnings | 14,966 | 45,898 |
| Accumulated other comprehensive income/(loss) | (406) | (584) |
| Total shareholders' equity | 65,339 | 90,488 |
| Total liabilities and shareholders' equity | $ 323,888 | $ 338,516 |

See accompanying notes to consolidated financial statements.
ABC Inc. | 2020 form 10-K

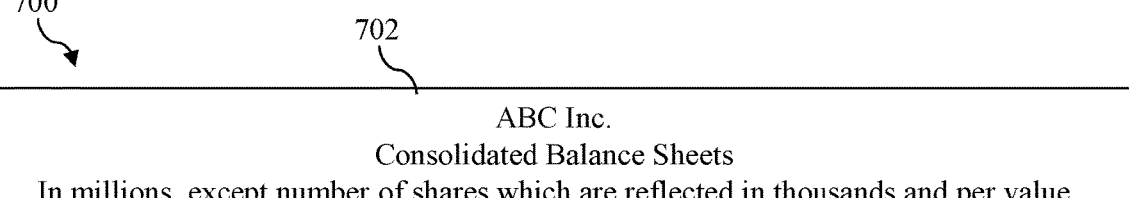

| | September 26, 2020 | September 28, 2019 |
|---|---|---|
| Assets | | |
| Current Assets: | | |
| Cash and Cash Equivalents | $ 38,016 | $ 48,844 |
| Marketable Securities | 52,927 | 51,713 |
| Account Receivables & Net | 16,120 | 22,926 |
| Inventories | 4,061 | 4,106 |
| Vendor non-trade Receivables | 21,325 | 22,878 |
| Other Current Assets | 11,264 | 12,352 |
| Total Current Assets | 143,713 | 162,819 |
| Marketable Securities | 100,887 | 105,341 |
| Property, plant, and equipment, net | 36,766 | 37,378 |
| Other non-current assets | 42,522 | 32,978 |
| Total non-current assets | 180,175 | 175,697 |
| Total assets | $ 323,888 | $ 338,516 |
| Liabilities and Stakeholders' Equity | | |
| Current Liabilities: | | |
| Accounts Payable | $ 42,296 | $ 46,236 |
| Other current liabilities | $ 42,684 | $ 37,720 |
| Deferred revenue | $ 6,643 | $ 5,522 |
| Commercial paper | $ 4,996 | $ 5,980 |

| Condensed Consolidated Balance Sheets (Unaudited) (In millions except share data) Liabilities and share owners' equity | | |
| --- | --- | --- |
| <Table><br><Caption> | March 31, 2001 | December 31, 2000 |
| <S> | <C> | <C> |
| Current | | |
| Accounts payable and accrued expenses | $ 3,978 | $ 3,905 |
| Loans and notes payable | 4,739 | 4,795 |
| Current maturities of long-term debt | 6 | 21 |
| Accrued income taxes | 768 | 600 |
| Total current liabilities | 9,491 | 9,321 |
| Long term debt | 1,359 | 835 |
| Other liabilities | 1,006 | 1,004 |
| Deferred income taxes | 392 | 358 |
| Share owners' equity | | |
| Common stock, $ .25 par value | | |
| Authorized: 5,600,000,000 shares | | |
| Issued: 3,485,563,683 shares at March 31; | | |
| Issued: 3,481,882,834 shares at December 31; | 871 | 870 |
| Capital surplus | 3,271 | 3,196 |
| Reinvested earnings | 21,679 | 21,265 |
| Accumulated other comprehensive income and unearned compensation on restricted stock | (2,456) | (2,722) |
| | 23,365 | 22,609 |
| Less treasury stock, at cost (998,546,692 shares at March 31; 997,121,427 shares at December 31) | 13,365 | 13,293 |
| | 10,000 | 9,316 |
| | $ 22,248 | $ 20,834 |

| | | | |
|---|---|---|---|
| Issued: 3,481,882,834 shares at December 31 | 871 | 870 | |
| | | | |
| Capital surplus | 3,271 | 3,196 | |
| Reinvested earnings | 21,679 | 21,265 | |
| Accumulated other comprehensive income and unearned compensation on restricted stock | (2,456) | (2,722) | |
| | 23,365 | 22,609 | |
| | | | |
| Less treasury stock, at cost | | | |
| (998,546,692 shares at March 31: | | | |
| 997,121,427 shares at December 31) | 13,365 | 13,293 | |
| | 10,000 | 9,316 | |
| | 22,248 | 20,834 | |

| Type of financial document | Income statement | | |
|---|---|---|---|
| Multiplier | Millions | | |
| Currency | USD | | |
| | | | |
| | | 2001 | | 2000 |
| <S> | <C> | | <C> | |
| Net operating revenues | $ | 4.479 | $ | 4.256 |
| Cost of goods sold | | 1.345 | | 1.398 |
| Gross profit | | 3.134 | | 2,858 |

| Type of financial document | Balance Sheet | |
|---|---|---|
| Multiplier | Millions | |
| Currency | USD | |
|    <Table> | | |
| <Caption> | | |
| | March 31, 2001 | December 31, 2000 |
| <S> | <C> | <C> |
| Current | | |
| Accounts payable and accrued expenses | 3,978 | 3,905 |
| Loans and notes payable | 4,739 | 4,795 |
| Current maturities of long-term debt | 6 | 21 |
| Accrued income taxes | 768 | 600 |
| Total current liabilities | 9,491 | 9,321 |
| Long-term debt | 1,359 | 835 |
| Other liabilities | 1,006 | 1,004 |
| Deferred income taxes | 392 | 358 |
| Shared-Owners' equity | | |
| Common stock, $ .25 per value | | |
| Authorized: 5,600,000,000 shares | | |
| Issued: 3,485,563,683 shares at March 31; | | |

| | | |
|---|---|---|
| Net cash provided by (used in) investing activities | 1,753 | (6,967) |
| Financing activities | | |
| Issuances of debt | 10,752 | 19,775 |
| Payments of debt | (11,957) | (10,304) |
| Issuances of stock | 342 | 444 |
| Purchases of stock for treasury | (104) | (93) |
| Dividends | (3,623) | (1,761) |
| Other financing activities | (372) | (16) |
| Net cash provided by (used in) financing activities | (4,962) | 8,045 |
| Effect of exchange rate changes on cash, cash equivalents, restricted cash and restricted cash equivalents | 82 | (172) |
| Cash, cash equivalents, restricted cash and restricted cash equivalents | | |
| Net increase (decrease) in cash, cash equivalents, restricted cash and restricted cash equivalents during the period | 2,398 | 3,692 |
| Cash, cash equivalents, restricted cash and restricted cash equivalents at beginning of period | 7,110 | 6,737 |
| Cash, cash equivalents, restricted cash and restricted cash equivalents at end of period | 9,508 | 10,429 |
| Less: Restricted cash and restricted cash equivalents at end of period | 320 | 392 |
| Cash and cash equivalents at end of period | $ 9,188 | $ 10,037 |

| ABC Corporation Condensed Consolidated Statements in Cash Flows (Unaudited) (In millions) | Six months ended | |
| --- | --- | --- |
| | July 2, 2021 | July 26, 2020 |
| Operating activities | | |
| Consolidated net income | $ 4,879 | $ 4,554 |
| Depreciation and amortization | 749 | 748 |
| Stock-based compensation expense | 148 | 36 |
| Deferred income taxes | 500 | (39) |
| Equity (income) loss – net of dividends | (333) | (212) |
| Foreign currency adjustments | (31) | (67) |
| Significant (gains) losses - net | (690) | (901) |
| Other operating charges | 238 | 341 |
| Other items | 503 | 52 |
| Net change in operating assets and liabilities | (438) | (1,726) |
| Net cash provided by operating activities | 5,525 | 2,786 |
| Investing activities | | |
| Purchases of investments | (3,431) | (8,294) |
| Proceeds from disposals of investments | 3,811 | 2,649 |
| Acquisitions of business, equity method investments and non-marketable securities | (11) | (984) |
| Proceeds from disposals of businesses, equity method investments and non-marketable securities | 1,765 | 46 |
| Purchases of property, plant and equipment | (450) | (536) |
| Proceeds from disposals of property, plant and equipment | 28 | 112 |
| Other investing activities | 41 | 40 |

| | | | |
|---|---|---|---|
| Proceeds from disposals of businesses | | 1,765 | 46 |
| Purchases of property, plant and equipment | | -450 | -536 |
| Proceeds from disposals of property, plant | | 28 | 112 |
| Other investment activities | | 41 | 40 |
| Net cash provided by (used in) investing activities | | 1,753 | -6,967 |
| Financing activities | | | |
| Issuances of debt | | 10,752 | 19,775 |
| Payments of debt | | -11,957 | -10,304 |
| Issuances of stock | | 342 | 444 |
| Purchases of stock for treasury | | -104 | -93 |
| Dividends | | -3,623 | -1,761 |
| Other financing activities | | -372 | -16 |
| Net cash provided by (used in) financing activities | | -4,962 | 8045 |
| Effect of exchange rate changes on cash, cash equivalents | | 82 | -172 |
| Cash equivalents | | | |
| Cash, cash equivalents, restricted cash and restricted cash equi. | | | |
| Net increase (decrease) in cash, cash equivalents, restricted cash and restricted cash equivalents | | 2,398 | 3,692 |
| During the period | | | |
| Cash, cash equivalents, restricted cash and restricted cash equivalents | | 7,110 | 6,737 |
| | | 9,508 | 10,429 |
| Less: Cash, cash equivalents, restricted cash and restricted cash equivalents | | 320 | 392 |
| Cash and cash equivalents at end of period | $ | 9, 188 | 10,037 |

| Type of financial statement | Cash flow statement | | |
|---|---|---|---|
| Multiplier | Millions | | |
| Currency | USD | | |
| | | | Six months ended |
| | | July 2, 2021 | June 26, 2020 |
| | | | |
| Operating activities | | | |
| Consolidated net income | $ | 4,879 | 4,554 |
| Depreciation and amortization | | 749 | 748 |
| Stock-based compensation expense | | 148 | 36 |
| Deferred income taxes | | 500 | -39 |
| Equity (income) loss net of dividends | | -333 | -212 |
| Foreign currency adjustments | | -31 | -67 |
| Significant (gains) losses | | -690 | -901 |
| Other operating charges | | 238 | 341 |
| Other items | | 503 | 52 |
| Net change in operating assets and liabilities | | -438 | -1,726 |
| Net cash provided by operating activities | | 5,525 | 2,786 |
| Investing activities | | | |
| Purchase of investments | | -3,431 | -8,294 |
| Proceeds from disposals of investments | | 3,811 | 2,649 |
| Acquisitions of business, equity method | | -11 | -984 |

EXTRACT ONE OR MORE FIRST DATA ASSOCIATED WITH ONE OR MORE FINANCIAL INFORMATION FROM THE ONE OR MORE TABULAR REGIONS DETERMINED FROM THE ONE OR MORE TABULAR DATA ASSOCIATED WITH THE ONE OR MORE SECOND IMAGES, BASED ON AN OPTICAL CHARACTER RECOGNITION (OCR) CONVERSION PROCESS     1010

EXTRACT ONE OR MORE SECOND DATA ASSOCIATED WITH THE ONE OR MORE FINANCIAL INFORMATION FROM ONE OR MORE NON-TABULAR REGIONS DETERMINED FROM THE ONE OR MORE NON-TABULAR DATA ASSOCIATED WITH THE ONE OR MORE THIRD IMAGES, BASED ON THE OPTICAL CHARACTER RECOGNITION (OCR) CONVERSION PROCESS     1012

PROVIDE AN OUTPUT OF AT LEAST ONE OF: THE ONE OR MORE FIRST DATA EXTRACTED FROM THE ONE OR MORE TABULAR REGIONS AND THE ONE OR MORE SECOND DATA EXTRACTED FROM THE ONE OR MORE NON-TABULAR REGIONS, TO ONE OR MORE SECOND USERS ON A USER INTERFACE ASSOCIATED WITH ONE OR MORE ELECTRONIC DEVICES     1014

RECEIVE ONE OR MORE ELECTRONIC DOCUMENTS FROM ONE OR MORE DATA SOURCES COMPRISING AT LEAST ONE OF: ONE OR MORE DATABASES, ONE OR MORE ELECTRONIC MAILS AND ONE OR MORE APPLICATION PROGRAMMING INTERFACES — 1002

CONVERT ONE OR MORE FORMATS OF THE ONE OR MORE ELECTRONIC DOCUMENTS INTO ONE OR MORE FIRST IMAGES ASSOCIATED WITH THE ONE OR MORE ELECTRONIC DOCUMENTS BASED ON ONE OR MORE INDUSTRY STANDARD IMAGE CONVERSION TOOLS — 1004

CLASSIFY THE ONE OR MORE FIRST IMAGES ASSOCIATED WITH THE ONE OR MORE ELECTRONIC DOCUMENTS AS AT LEAST ONE OF: ONE OR MORE SECOND IMAGES COMPRISING ONE OR MORE TABULAR DATA, AND ONE OR MORE THIRD IMAGES COMPRISING ONE OR MORE NON-TABULAR DATA, BASED ON A CONVOLUTIONAL NEURAL NETWORK (CNN) BASED MACHINE LEARNING MODEL — 1006

DETERMINE ONE OR MORE TABULAR REGIONS IN THE ONE OR MORE TABULAR DATA ASSOCIATED WITH THE ONE OR MORE SECOND IMAGES BY IDENTIFYING ONE OR MORE BOUNDING BOX COORDINATES INDICATING THE ONE OR MORE TABULAR REGIONS IN THE ONE OR MORE TABULAR DATA ASSOCIATED WITH THE ONE OR MORE SECOND IMAGES, BASED ON A YOU ONLY LOOK ONCE (YOLO) ARCHITECTURE BASED MACHINE LEARNING MODEL — 1008

FIG. 10
(Contd.,)

MACHINE LEARNING BASED SYSTEMS AND METHODS FOR DATA EXTRACTION FROM FINANCIAL STATEMENTS

FIELD OF INVENTION

Embodiments of the present disclosure relate to machine learning based (ML-based) computing systems, and more particularly relates to a ML-based computing method and system for extracting one or more data from one or more electronic documents (e.g., one or more financial documents).

BACKGROUND

In a finance domain, utilization of data extracted from financial documents including at least one of: balance sheet, cash flow Statement, and income statement serves various functions, including at least one of: financial analysis and evaluating creditworthiness. Currently, obtaining this data involves manual input by financial analysts or the extraction of information using optical character recognition (OCR) technology, which is subsequently verified and entered manually by the financial analysts.

Significantly, there is a lack of universally accepted standardization for a format of data in financial statements. As a result, information within these financial documents may be intricate and pose challenges in interpretation. For instance, financial figures in one statement may be expressed in millions, whereas another statement might use hundreds of thousands as the unit of measurement. Additionally, currency denomination varies, with some financial statements using USD and others opting for EURO.

To address these challenges, existing solutions involve using generic document parsing software and OCR systems to process the financial statements. However, these existing solutions have inherent drawbacks, including low accuracy and processing speed. Additionally, these parsing systems or OCR systems are often customized for specific clients or document formats, lacking adaptability to handle the financial documents from different clients. Consequently, whenever a new type of financial statement is received, sellers or businesses must reconfigure the parsing systems or OCR systems, resulting in time-consuming and inefficient adjustments.

Hence, there is a need for an improved machine learning based (ML-based) computing system and method for extracting one or more data from one or more electronic documents, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for extracting one or more data from one or more electronic documents, is disclosed. The ML-based computing method comprises receiving, by one or more hardware processors, the one or more electronic documents from one or more data sources comprising at least one of: one or more databases, one or more electronic mails and one or more application programming interfaces. The one or more electronic documents are associated with one or more financial statements comprising at least one of: one or more balance sheets, one or more income statements, and one or more cash flow statements, of one or more first users.

The ML-based computing method further comprises converting, by the one or more hardware processors, one or more formats of the one or more electronic documents into one or more first images associated with the one or more electronic documents based on one or more industry standard image-conversion tools.

The ML-based computing method further comprises classifying, by the one or more hardware processors, the one or more first images associated with the one or more electronic documents as at least one of: one or more second images comprising one or more tabular data, and one or more third images comprising one or more non-tabular data, based on a convolutional neural network (CNN) based machine learning model.

The ML-based computing method further comprises determining, by the one or more hardware processors, one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model.

The ML-based computing method further comprises extracting, by the one or more hardware processors, one or more first data associated with one or more financial information from the one or more tabular regions determined from the one or more tabular data associated with the one or more second images, based on an optical character recognition (OCR) conversion process.

The ML-based computing method further comprises extracting, by the one or more hardware processors, one or more second data associated with the one or more financial information from one or more non-tabular regions determined from the one or more non-tabular data associated with the one or more third images, based on the optical character recognition (OCR) conversion process. The extracted one or more second data are configured to provide one or more contexts to the one or more tabular data associated with the one or more second images.

The ML-based computing method further comprises providing, by the one or more hardware processors, an output of at least one of: the one or more first data extracted from the one or more tabular regions and the one or more second data extracted from the one or more non-tabular regions, to one or more second users on a user interface associated with one or more electronic devices.

In an embodiment, converting the one or more formats of the one or more electronic documents into the one or more first images associated with the one or more electronic documents, comprises (a) determining, by the one or more hardware processors, whether the one or more first images indicate one or more visual appearances of the one or more formats of the one or more electronic documents, by parsing one or more contents associated with the one or more electronic documents for interpreting the one or more contents of each page of the one or more electronic documents; (b) upon determining whether the one or more first images indicate the one or more visual appearances of the one or more formats of the one or more electronic documents, converting, by the one or more hardware processors, the one or more formats of the one or more contents into the one or more first images associated with the one or more electronic documents. The one or more contents comprise at least one of: one or more texts, one or more graphics, and one or more layout elements, associated with the one or more electronic documents.

In another embodiment, classifying, by the convolutional neural network (CNN) based machine learning model, the one or more first images associated with the one or more electronic documents, comprises: (a) preprocessing, by the one or more hardware processors, the one or more first images associated with the one or more electronic documents; (b) obtaining, by the one or more hardware processors, the preprocessed one or more first images at the convolutional neural network (CNN) based machine learning model; and (c) classifying, by the one or more hardware processors, the one or more first images associated with the one or more electronic documents as at least one of: the one or more second images comprising the one or more tabular data and the one or more third images comprising the one or more non-tabular data, by processing the preprocessed one or more first images based on the combination of the one or more layers of the convolutional neural network (CNN) based machine learning model.

Preprocessing the one or more first images comprises at least one of: standardizing the one or more formats of the one or more electronic documents, and resizing the one or more formats of the one or more electronic documents to one or more dimensions. The convolutional neural network (CNN) based machine learning model is a combination of one or more layers comprising at least one of: one or more convolutional layers, one or more pooling layers, one or more batch normalization layers, and one or more dropout layers.

In yet another embodiment, the ML-based computing method further comprises training, by the one or more hardware processors, the convolutional neural network (CNN) based machine learning model, by: (a) obtaining, by the one or more hardware processors, one or more first datasets associated with the one or more first images for training the convolutional neural network (CNN) based machine learning model; (b) preprocessing, by the one or more hardware processors, the one or more first images associated with the one or more electronic documents; (c) labelling, by the one or more hardware processors, the one or more first images in the one or more first datasets, as the one or more second images comprising the one or more tabular data, and the one or more third images comprising the one or more non-tabular data; (d) segmenting, by the one or more hardware processors, the one or more first datasets into at least one of: one or more first training datasets and one or more first validation datasets; (e) training, by the one or more hardware processors, the convolutional neural network (CNN) based machine learning model to classify the one or more first images as the one or more second images comprising the one or more tabular data, and the one or more third images comprising the one or more non-tabular data, by: (i) obtaining, by the one or more hardware processors, the one or more first images and one or more labels corresponding to the one or more first images, at the convolutional neural network (CNN) based machine learning model; and (ii) updating, by the one or more hardware processors, one or more first hyperparameters to learn one or more patterns for accurately classifying the one or more first images as the one or more second images comprising the one or more tabular data, and the one or more third images comprising the one or more non-tabular data, based on a root mean square propagation model; (f) validating, by the one or more hardware processors, the convolutional neural network (CNN) based machine learning model based on the one or more first validation datasets by determining, by the one or more hardware processors, whether at least one of: the convolutional neural network (CNN) based machine learning model learns the one or more patterns and the convolutional neural network (CNN) based machine learning model is having risk of overfitting, based on one or more first metrics comprising accuracy metric and loss metric; and (g) adjusting, by the one or more hardware processors, the one or more first hyperparameters to fine-tune the convolutional neural network (CNN) based machine learning model based on one or more first results of validation of the convolutional neural network (CNN) based machine learning model.

The one or more first hyperparameters comprise at least one of: learning rates, batch sizes, and architectural parameters. The root mean square propagation model is configured to compute one or more first moving averages of one or more first squared gradients of one or more first loss functions to normalize one or more first learning rates for the one or more first hyperparameters during the training of the convolutional neural network (CNN) based machine learning model.

In yet another embodiment, the ML-based computing method further comprises re-training, by the one or more hardware processors, the convolutional neural network (CNN) based machine learning model over a plurality of time intervals based on one or more first training data by: (a) receiving, by the one or more hardware processors, the one or more first training data over the plurality of first time intervals; (b) adding, by the one or more hardware processors, the one or more first training data with the one or more first training datasets to generate one or more updated first training datasets; (c) re-training, by the one or more hardware processors, the convolutional neural network (CNN) based machine learning model based on the one or more updated first training datasets; and (d) executing, by the one or more hardware processors, the re-trained convolutional neural network (CNN) based machine learning model in a page classification subsystem to classify the one or more first images as the one or more second images comprising the one or more tabular data, and the one or more third images comprising the one or more non-tabular data.

In yet another embodiment, determining, by the you only look once (YOLO) architecture based machine learning model, the one or more tabular regions in the one or more tabular data associated with the one or more second images, comprises: (a) obtaining, by the one or more hardware processors, the one or more second images associated with the one or more electronic documents; (b) preprocessing, by the one or more hardware processors, the one or more second images by resizing the one or more second images; (c) determining, by the one or more hardware processors, at least one of: a first sized tabular region based on a first convolution stride at a first layer model of the you only look once (YOLO) architecture based machine learning model, a second sized tabular region based on a second convolution stride at a second layer model of the you only look once (YOLO) architecture based machine learning model, and a third sized tabular region based on a third convolution stride at a third layer model of the you only look once (YOLO) architecture based machine learning model; (d) identifying, by the one or more hardware processors, the one or more bounding box coordinates indicating at least one of: the first sized tabular region, the second sized tabular region, and the third sized tabular region, in the one or more tabular data associated with the one or more second images; (e) generating, by the one or more hardware processors, one or more confidence scores to analyze confidence level of the you only look once (YOLO) architecture based machine learning model on the determination of at least one of: the first sized tabular region, the second sized tabular region, and the third sized tabular region; and (f) applying, by the one or more hardware processors, a non-maximum suppression technique for classifying one or more redundant bounding boxes to determine whether at least one of: the one or more tabular regions are accurate and the one or more tabular regions are non-overlapped.

In yet another embodiment, the ML-based computing method further comprises training, by the one or more hardware processors, the you only look once (YOLO) architecture based machine learning model, by: (a) obtaining, by the one or more hardware processors, one or more second datasets associated with the one or more second images for training the you only look once (YOLO) architecture based machine learning model; (b) selecting, by the one or more hardware processors, one or more features to determine the one or more tabular regions in the one or more tabular data associated with the one or more second images; (c) labelling, by the one or more hardware processors, the one or more second images by marking the one or more bounding box coordinates indicating the one or more locations of the one or more tabular regions in the one or more tabular data associated with the one or more second images; (d) segmenting, by the one or more hardware processors, the one or more second datasets into at least one of: one or more second training datasets and one or more second validation datasets; (e) training, by the one or more hardware processors, the you only look once (YOLO) architecture based machine learning model to determine the one or more tabular regions based on one or more second hyperparameters and weights; (f) validating, by the one or more hardware processors, the you only look once (YOLO) architecture based machine learning model based on the one or more second validation datasets by determining whether the you only look once (YOLO) architecture based machine learning model accurately determines the one or more tabular regions based on one or more second metrics, wherein the one or more second metrics comprise at least one of: precision metric, recall metric, and F1-score metric; and (g) adjusting, by the one or more hardware processors, the one or more second hyperparameters to fine-tune the you only look once (YOLO) architecture based machine learning model based on one or more second results of validation of the you only look once (YOLO) architecture based machine learning model.

The one or more second hyperparameters comprise at least one of: learning rate, rho, momentum, epsilon, centered, name, weight_decay, clipnorm, clipvalue, global_clipnorm, use_ema, ema_momentum, and ema_overwrite_frequency. The root mean square propagation model is configured to compute one or more second moving averages of one or more second squared gradients of one or more second loss functions to normalize one or more second learning rates for the one or more second hyperparameters during the training of the you only look once (YOLO) architecture based machine learning model.

In yet another embodiment, the ML-based computing method further comprises re-training, by the one or more hardware processors, the you only look once (YOLO) architecture based machine learning model over a plurality of second time intervals based on one or more second training data, by: (a) receiving, by the one or more second hardware processors, the one or more second training data over the plurality of second time intervals; (b) adding, by the one or more hardware processors, the one or more second training data with the one or more second training datasets to generate one or more updated second training datasets; (c) re-training, by the one or more hardware processors, the you only look once (YOLO) architecture based machine learning model based on the one or more updated second training datasets; and (d) executing, by the one or more hardware processors, the re-trained you only look once (YOLO) architecture based machine learning model in a table region determining subsystem to determine the one or more bounding box coordinates indicating the one or more tabular regions in the one or more tabular data associated with the one or more second images.

In yet another embodiment, the ML-based computing method further comprises arranging, by the one or more hardware processors, the extracted one or more first data comprising one or more texts in one or more structured tables, based on a preprocessing model, by: (a) sorting, by the one or more hardware processors, the one or more texts in a descending order based on one or more Y-coordinate values; (b) identifying, by the one or more hardware processors, the one or more rows by determining an absolute difference between one or more consecutive Y-coordinate values; (c) determining, by the one or more hardware processors, whether the one or more rows are last rows; (d) adding, by the one or more hardware processors, the one or more Y-coordinate values at a previous row, to a new list when one or more Y-coordinate differences are equal to a predetermined value; and (e) fragmenting, by the one or more hardware processors, the one or more rows across the one or more texts upon addition of the one or more Y-coordinate values at the previous row, to the new list.

In yet another embodiment, providing, by the one or more hardware processors, the one or more contexts associated with the one or more second data, to the one or more tabular data, by: (a) splitting, by the one or more hardware processors, the one or more phrases associated with the one or more second data, into one or more individual words; (b) preprocessing, by the one or more hardware processors, the one or more individual words; (c) determining, by the one or more hardware processors, one or more types of tables in the one or more electronic documents by comparing the preprocessed one or more individual words with one or more prestored keywords stored in one or more databases, based on content-based keyword search technique; (d) classifying, by the one or more hardware processors, the one or more types of tables in the one or more electronic documents by generating one or more similarity scores based on the comparison of the preprocessed one or more individual words with the one or more prestored keywords.

Preprocessing the one or more individual words comprise at least one of: converting the one or more individual words to lowercases, eliminating one or more common stop words, and removing one or more extraneous data from the one or more individual words. The one or more similarity scores indicate one or more similarities among the one or more prestored keywords to classify the one or more types of tables.

In one aspect, a machine learning based (ML-based) computing system for extracting one or more data from one or more electronic documents, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises a document acquisition subsystem configured to receive the one or more electronic documents from one or more data sources comprising at least one of: one or more databases, one or more electronic mails and one or more application programming interfaces. The one or more electronic documents are associated with one or more financial statements comprising at least one of: one or more balance sheets, one or more income statements, and one or more cash flow statements, of one or more first users.

The plurality of subsystems further comprises a document conversion subsystem configured to convert one or more formats of the one or more electronic documents into one or more first images associated with the one or more electronic documents based on one or more industry standard image-conversion tools.

The plurality of subsystems further comprises a page classification subsystem configured to classify the one or more first images associated with the one or more electronic documents as at least one of: one or more second images comprising one or more tabular data, and one or more third images comprising one or more non-tabular data, based on a convolutional neural network (CNN) based machine learning model.

The plurality of subsystems further comprises a table region determining subsystem configured to determine one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model.

The plurality of subsystems further comprises a data extraction subsystem configured to: (a) extract one or more first data associated with one or more financial information from the one or more tabular regions determined from the one or more tabular data associated with the one or more second images, based on an optical character recognition (OCR) conversion process; and (b) extract one or more second data associated with the one or more financial information from one or more non-tabular regions determined from the one or more non-tabular data associated with the one or more third images, based on the optical character recognition (OCR) conversion process. The extracted one or more second data are configured to provide one or more contexts to the one or more tabular data associated with the one or more second images.

The plurality of subsystems further comprises an output subsystem configured to provide an output of at least one of: the one or more first data extracted from the one or more tabular regions and the one or more second data extracted from the one or more non-tabular regions, to one or more second users on a user interface associated with one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is an overall process flow of automatic extraction of the one or more data from the one or more electronic documents, in accordance with another embodiment of the present disclosure;

FIG. 4 is a process flow of training a convolutional neural network (CNN) based machine learning model to classify one or more first images as one or more second images including one or more tabular data, and one or more third images including one or more non-tabular data, in accordance with an embodiment of the present disclosure;

FIG. 5 is a process flow of training a you only look once (YOLO) architecture based machine learning model to determine one or more tabular regions in the one or more tabular data associated with the one or more second images, in accordance with an embodiment of the present disclosure;

FIG. 6 is an exemplary representation depicting the classification of the one or more first images associated with the one or more electronic documents as at least one of: the one or more second images including the one or more tabular data, and the one or more third images including the one or more non-tabular data, in accordance with an embodiment of the present disclosure;

FIG. 7 is an exemplary representation depicting the determination of the one or more tabular regions in the one or more tabular data associated with the one or more second images, in accordance with an embodiment of the present disclosure;

FIGS. 8A-8C are exemplary representations depicting inputs and outputs of the ML-based computing system, in accordance with another embodiment of the present disclosure;

FIGS. 9A-9B are exemplary representations depicting the inputs and outputs of the ML-based computing system, in accordance with another embodiment of the present disclosure; and FIG. 10 is an flow chart illustrating a machine-learning based (ML-based) computing method for extracting the one or more data from the one or more electronic documents, in accordance with an embodiment of the present disclosure.

Figure 1:
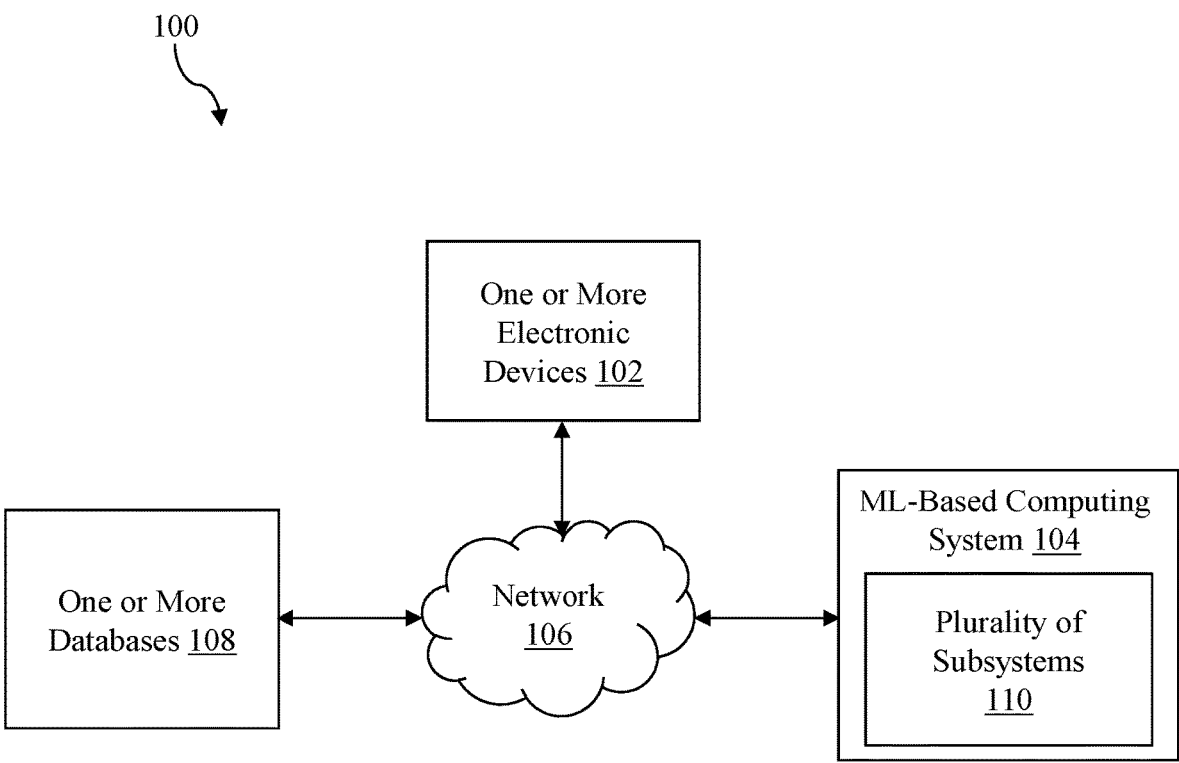
FIG. 1 is a block diagram illustrating a computing environment with a machine learning based (ML-based) computing system for extracting one or more data from one or more electronic documents, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for extracting the one or more data from one or more electronic documents (e.g., one or more financial documents), in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more second users provide one or more inputs to the ML-based computing system 104.

In an embodiment, the one or more second users may include at least one of: one or more data analysts, one or more business analysts, one or more cash analysts, one or more financial analysts, one or more collection analysts, one or more debt collectors, one or more professionals associated with cash and collection management, and the like.

The present invention is configured to automatically provide parsed and extracted one or more data from the one or more financial documents to the one or more second users through the one or more electronic devices 102. The ML-based computing system 104 is initially configured to receive the one or more electronic documents from one or more data sources including at least one of: one or more databases 108, one or more electronic mails and one or more application programming interfaces.

The one or more electronic documents are associated with one or more financial statements including at least one of: one or more balance sheets, one or more income statements, and one or more cash flow statements, of one or more first users. In an embodiment, the one or more electronic documents may be encrypted and decrypted by the ML-based computing system 104 so that one or more third party users cannot be authenticated to manipulate the one or more electronic documents. In an embodiment, the one or more first users may include at least one of: one or more customers, one or more organizations, one or more corporations, one or more parent companies, one or more subsidiaries, one or more joint ventures, one or more partnerships, one or more governmental bodies, one or more associations, one or more legal entities, and the like.

The ML-based computing system 104 is further configured to convert one or more formats of the one or more electronic documents into one or more first images associated with the one or more electronic documents based on one or more industry standard image-conversion tools. The ML-based computing system 104 is further configured to classify the one or more first images associated with the one or more electronic documents as at least one of: one or more second images including one or more tabular data, and one or more third images including one or more non-tabular data, based on a convolutional neural network (CNN) based machine learning model.

The ML-based computing system 104 is further configured to determine one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model. The ML-based computing system 104 is further configured to extract one or more first data associated with one or more financial information from the one or more tabular regions determined from the one or more tabular data associated with the one or more second images, based on an optical character recognition (OCR) conversion process.

The ML-based computing system 104 is further configured to extract one or more second data associated with the one or more financial information from one or more non-tabular regions determined from the one or more non-tabular data associated with the one or more third images, based on the optical character recognition (OCR) conversion process. The extracted one or more second data are configured to provide one or more contexts to the one or more tabular data associated with the one or more second images. The ML-based computing system 104 is further configured to provide an output of at least one of: the one or more first data extracted from the one or more tabular regions and the one or more second data extracted from the one or more non-tabular regions, to the one or more second users on the user interface associated with the one or more electronic devices 102.

The ML-based computing system 104 may be hosted on a central server including at least one of: a cloud server or a remote server. In an embodiment, the ML-based computing system 104 may include at least one of: a user device, a server computer, a server computer over the network 106, a cloud-based computing system, a cloud-based computing system over the network 106, a distributed computing system, and the like. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smart-phone, a wearable device, a Smart watch, and the like.

Further, the computing environment 100 includes the one or more databases 108 communicatively coupled to the ML-based computing system 104 through the network 106. In an embodiment, the one or more databases 108 include at least one of: one or more relational databases, one or more object-oriented databases, one or more data warehouses, one or more cloud-based databases, and the like. In another embodiment, a format of the one or more data extracted from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like.

Furthermore, the one or more second users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
FIG. 2 is a detailed view of the ML-based computing system for extracting the one or more data from the one or more electronic documents, in accordance with another embodiment of the present disclosure.

FIG. 2 is a detailed view of the ML-based computing system 104 for extracting the one or more data from the one or more electronic documents, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a document acquisition subsystem 210, a document conversion subsystem 212, a page classification subsystem 214, a table region determining subsystem 216, a data extraction subsystem 218, an output subsystem 220, and a training subsystem 222. The brief details of the plurality of subsystems 110 have been elaborated in a below table.

| Plurality of Subsystems 110 | Functionality |
| --- | --- |
| Document acquisition subsystem 210 | The document acquisition subsystem 210 is configured to receive the one or more electronic documents from the one or more data sources including at least one of: the one or more databases 108, one or more electronic mails and one or more application programming interfaces. |
| Document conversion subsystem 212 | The document conversion subsystem 212 is configured to convert the one or more formats of the one or more electronic documents into the one or more first images associated with the one or more electronic documents based on the one or more industry standard image-conversion tools. |
| Page classification subsystem 214 | The page classification subsystem 214 is configured to classify the one or more first images associated with the one or more electronic documents as at least one of: the one or more second images including the one or more tabular data, and the one or more third images including the one or more non-tabular data, based on the convolutional neural network (CNN) based machine learning model. |
| Table region determining subsystem 216 | The table region determining subsystem 216 is configured to determine the one or more tabular regions in the one or more tabular data associated with the one or more second images by identifying the one or more bounding box coordinates indicating the one or more tabular regions in the one or more tabular data associated with the one or more second images, based on the you only look once (YOLO) architecture based machine learning model. |
| Data extraction subsystem 218 | The data extraction subsystem 218 is configured to extract the one or more first data associated with the one or more financial information from the one or more tabular regions determined from the one or more tabular data associated with the one or more second images, based on the optical character recognition (OCR) conversion process. The data extraction subsystem 218 is further configured to extract the one or more second data associated with the one or more financial information from the one or more non-tabular |

-continued

| Plurality of Subsystems 110 | Functionality |
|---|---|
| | regions determined from the one or more non-tabular data associated with the one or more third images, based on the optical character recognition (OCR) conversion process. |
| Output Subsystem 220 | The output subsystem 220 is configured to provide the output of at least one of: the one or more first data extracted from the one or more tabular regions and the one or more second data extracted from the one or more non-tabular regions, to the one or more second users on the user interface associated with the one or more electronic devices 102. |
| Training subsystem 222 | The training subsystem 222 is configured to re-train the CNN based machine learning model, and the YOLO architecture based machine learning model over a plurality of time intervals with one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the document acquisition subsystem 210 that is communicatively connected to the one or more hardware processors 204. The document acquisition subsystem 210 is configured to receive the one or more electronic documents from the one or more data sources including at least one of: the one or more databases 108, the one or more electronic mails and the one or more application programming interfaces. The one or more electronic documents are associated with the one or more financial statements including at least one of: the one or more balance sheets, the one or more income statements, and the one or more cash flow statements, of the one or more first users.

In an embodiment, the document acquisition subsystem 210 is configured to manage and facilitate the import of the one or more financial statements. The one or more financial statements are written reports that depict financial performance and position of a company over a certain period of time. The one or more financial statements are prepared according to standardized accounting rules and principles to ensure consistency and reliability. The one or more financial statements are used by one or more stakeholders including at least one of: one or more investors, one or more creditors, one or more regulators, and one or more managers, to determine the company's financial health and make informed decisions.

In an embodiment, the one or more balance sheets depict company's assets, liabilities, and stakeholders' equity at a specific point of time. The one or more balance sheets are determined in the form of assets by adding the one or more liabilities with the shareholders' equity (e.g., Assets=liabilities+shareholders' equity). The Assets are resources that the company owns or controls, including at least one of: cash, inventory, property, plant, equipment, and the like. The liabilities are obligations that the company owes to others, including at least one of: accounts payable, loans, bonds, and the like. The shareholders' equity is a residual interest that the owners have in the company after deducting the liabilities from the assets. The shareholders' equity includes at least one of: share capital, retained earnings, and other components.

In an embodiment, the one or more income statements depicts the company's revenues, expenses, and net income (or loss) for a specific period of time. The one or more income statements in a form of net income is determined by subtracting the expense from the revenue (e.g., net income=revenues−expenses). The revenues are inflows of money or other resources that the company earns from its core business activities, including at least one of: sales of goods or services. The expenses are outflows of money or other resources that the company incurs to generate revenues, including at least one of: cost of goods sold, salaries, rent, interest, and the like. The net income is the difference between the revenues and the expenses. The net income represents the amount of money that the company has earned or lost during the period.

In an embodiment, the one or more cash flow statements depict the company's cash inflows and outflows for a specific period of time. The one or more cash flow statements in a form of net change in cash is determined by adding cash flow from operating activities, cash flow from investing activities, and the cash flow from financing activities (e.g., net change in cash=cash flow from operating activities+cash flow from investing activities+cash flow from financing activities). The Cash flow from operating activities is the amount of cash that the company generates or uses from its normal business operations, including at least one of: collecting payments from their customers or paying suppliers. The cash flow from investing activities is the amount of cash that the company invests or receives from its long-term assets, including at least one of: buying or selling property, plant, equipment, and the like. The cash flow from financing activities is the amount of cash that the company raises or repays from its long-term liabilities and shareholders' equity, including at least one of: issuing or repaying loans or bonds, or issuing or repurchasing shares.

The one or more financial statements provide valuable information about a company's financial performance and position. The one or more financial statements help stakeholders to determine how well a company is using its resources, generating profits, managing its debts, and creating value for its owners. The one or more financial statements further help stakeholders to compare different companies in terms of their financial strengths and weaknesses. Each type of the one or more financial statements includes different types of information that reflect different aspects of a company's financial performance and position.

As a non-limiting example, the one or more balance sheets include information about the company's assets, liabilities, and shareholders' equity at the specific point in time. The one or more balance sheets depict what the company owns, is owing, and is worth. The one or more balance sheets can help the stakeholders to determine company's liquidity, solvency, efficiency, and profitability ratios. For example, a current ratio measures the company's ability to pay its short-term obligations with its current assets. The debt-to-equity ratio measures company's leverage and financial risk. The return on assets ratio measures company's profitability relative to its total assets.

As a non-limiting example, the one or more income statements include information about the company's revenues, expenses, and net income (or loss) for the specific period of time. The one or more income statements depict how much the company earns, spends, and keeps. The one or more income statements can help the stakeholders to determine company's operating performance, profitability, and growth potential. For example, gross profit margin measures the company's profitability from its core business activities. The operating income margin measures the company's profitability after deducting operating expenses. The earnings per share measures the company's profitability per share of common stock.

As a non-limiting example, the one or more cash flow statements include information about the company's cash inflows and outflows for the specific period of time. The one or more cash flow statements depict how much cash the company generates or uses from its operating, investing, and financing activities. The one or more cash flow statements can help the stakeholders to determine the company's liquidity, solvency, and cash management. For example, the operating cash flow measures the amount of cash that the company generates from its normal business operations. The free cash flow measures the amount of cash that the company has left after investing in its long-term assets. The cash flow to net income ratio measures the quality of the company's earnings.

In an embodiment, the document acquisition subsystem 210 may have the capability to support an extensive range of the one or more financial statements in one or more document formats (e.g., tabular data, non-tabular data, and the like) and one or more document types including, but not limited to, a portable document format (PDF). The other document types may include spreadsheets, text documents, images, Joint Photographic Experts Group (JPG), portable network graphics (PNG), giga (GIG) format, tag image file format (TIFF), an electronic mail (email), hypertext markup language (HTML), extensible markup language (XML), comma-separated values (CSV) files, and others commonly employed in financial systems.

In an embodiment, the document acquisition subsystem 210 is configured to process the one or more electronic documents written in one or more Latin script languages including at least one of: English, Portuguese Brazil, Danish, Dutch, Finnish, French, German, Italian, Norwegian, Romanian, Spanish and Swedish, and the like. In various implementations, the document acquisition subsystem 210 is configured to provide an interactive interface that enables manual document uploads by the one or more second users. The user interface includes validation and error-checking mechanisms to ensure the uploaded files adhere to supported formats. The document acquisition subsystem 210 is configured to provide immediate feedback to the one or more second users if the uploaded document's format is incompatible. In some embodiments, the document acquisition subsystem 210 is configured to autonomously retrieve the one or more electronic documents from an integrated database, including a financial data repository. Regardless of the format or language in which the one or more electronic documents are stored, the document acquisition subsystem 210 is configured to automatically identify and extract pertinent documents.

For example, the document acquisition subsystem 210 is configured to identify and extract the one or more electronic documents associated with the one or more financial statements. In order to search, find, and/or extract the one or more electronic documents associated with the one or more financial statements, the document acquisition subsystem 210 is configured to search for the one or more electronic documents with specific features. In a non-limiting example, the document acquisition subsystem 210 is further configured to search for the one or more electronic documents and extract the one or more electronic documents including at least one of: the one or more balance sheets, the one or more income statements, the one or more cash flow statements, and the like.

In some implementations, the document acquisition subsystem 210 may be configured to retrieve the one or more electronic documents from one or more external databases through the application programming interfaces (APIs). The document acquisition subsystem 210 is designed to handle a wide variety of APIs used for accessing the one or more financial documents in diverse formats and languages. The user authentication and secure document access are safeguarded during this process, and the Document acquisition subsystem 210 is configured to provide feedback if an incompatible document format is detected. Depending on the implementation, the document acquisition subsystem 210 may be configured for extracting the one or more electronic documents from the one or more electronic mails by monitoring a specific electronic mail account and processing attachments, which includes validation checks to verify the compatibility of document formats, and also maintains secure access protocols to ensure the confidentiality of the information contained within the one or more electronic mails. The document acquisition subsystem 210 may be configured to provide feedback to the one or more second users if an attached document's format is not supported by the ML-based computing system 104.

In some embodiments, the document acquisition subsystem 210 is configured to monitor a specific electronic mail account for the one or more electronic documents including the one or more financial statements. In order to monitor the specific electronic mail account, the document acquisition subsystem 210 is configured to monitor the electronic mail account, electronic mail messages (e.g., body or subject line of an electronic mail) attachments to the electronic mails, or the like for specific information. When the one or more financial statements are identified, the document acquisition subsystem 210 is configured to extract the one or more financial statements and store the one or more financial statements. As an example, the document acquisition subsystem 210 may be physically embodied in several different forms of hardware. The document acquisition subsystem 210 may include one or more servers, which provide the necessary computational capacity and data storage capabilities required by the document acquisition subsystem 210. The one or more servers could be single machines or form part of a distributed network, which can be located either on-premises or in a cloud environment. One or more data storage devices may also be incorporated, including one or more hard disk drives (HDDs), one or more solid-state drives (SSDs), one or more network-attached storage (NAS) devices, and the like.

The document acquisition subsystem 210 may be implemented with one or more network equipments, including at least one of: one or more routers, one or more switches, and one or more firewalls, to enable network communication and data transfer protocols. The one or more network equipments/components assist in maintaining connectivity between the document acquisition subsystem 210, other subsystems in the ML-based computing system 104, the one or more databases 108, and external APIs, while also ensuring the secure transmission of the one or more data. For manual user interaction with the document acquisition subsystem 210, one or more input/output devices including at least one of: one or more keyboards, one or more mice, one or more touchscreens, one or more monitors, and one or more printers, may be utilized. The devices allow the one or more second users to upload the one or more electronic documents to the document acquisition subsystem 210 and receive feedback about the processing status. In situations where physical documents are to be digitized, one or more scanner devices may be employed. Depending on the implementation, security may be a concern for the document acquisition subsystem 210, and as such, dedicated security hardware, including at least one of: hardware-based firewalls or secure servers, may be used to safeguard sensitive data. For certain applications, the document acquisition subsystem 210 is configured to interface with third-party APIs. In an embodiment, an API gateway device may be used to manage, route, and secure API calls effectively.

The plurality of subsystems 110 further includes the document conversion subsystem 212 that is communicatively connected to the one or more hardware processors 204. The document conversion subsystem 212 is configured to convert the one or more formats of the one or more electronic documents into the one or more first images associated with the one or more electronic documents based on the one or more industry standard image-conversion tools. In an embodiment, the document conversion subsystem 212 is configured to obtain a single PDF file or group of PDF files. The document conversion subsystem 212 is configured to access the PDF's internal structure and extracts each page as a separate unit for conversion. This separation is particularly beneficial in scenarios where the one or more second users may need to convert specific pages or subsets of pages, allowing for granular control over the conversion process.

In an embodiment, the one or more industry standard image-conversion tools may include at least one of: Poppler, Ghostscript, and similar PDF processing tools. For converting the one or more formats (e.g., the PDF file format) of the one or more electronic documents into the one or more first images (e.g., JPEG, PNG, or TIFF format) associated with the one or more electronic documents, the document conversion subsystem 212 is configured to determine whether the one or more first images indicate one or more visual appearances of the one or more formats of the one or more electronic documents, by parsing one or more contents associated with the one or more electronic documents for interpreting the one or more contents of each page of the one or more electronic documents. In an embodiment, the one or more contents may include at least one of: one or more texts, one or more graphics, and one or more layout elements, associated with the one or more electronic documents. The parsing one or more contents associated with the one or more electronic documents may include handling of one or more complex elements including at least one of: vector graphics, fonts, text with various fonts and sizes, and even embedded images, within the PDF format.

upon determining whether the one or more first images indicate the one or more visual appearances of the one or more formats of the one or more electronic documents, the document conversion subsystem 212 is configured to convert the one or more formats of the one or more contents into the one or more first images associated with the one or more electronic documents. Depending on user preferences or system settings, the document conversion subsystem 212 is configured to provide one or more options for converting to different image formats including the JPEG format for lossy compression, the PNG format for lossless compression, or the TIFF format for high-quality images with support for multiple layers and transparency. The one or more second users may typically customize settings including at least one of: image resolution, color depth, and compression level, to meet specific requirements. The document conversion subsystem 212 is configured to addresses challenges related to multi-page PDFs by iterating through the entire electronic document, ensuring that each page is processed consistently and accurately. The document conversion subsystem 212 is further configured to manage the naming and organization of the resulting image files, often allowing the one or more second users to specify naming conventions or auto-generating them based on the original PDF content.

In an embodiment, the document conversion subsystem 212 is further configured to provide error handling and reporting mechanisms, allowing it to handle exceptions like corrupted PDF files or those with password protection. The document conversion subsystem 212 may also include features to control the generation of metadata, including at least one of: image titles, descriptions, and tags, enhancing the accessibility and manageability of the converted one or more first images.

As a non-limiting example, the document conversion subsystem 212 is configured to utilize the one or more industry standard image conversion tools including the Apache PDFBox for converting PDFs to images. The Apache PDFBox is a widely recognized open-source library, is configured to enhance the capabilities of the document conversion subsystem 212. The one or more industry standard image conversion tools play a crucial role in determining the precise and efficient conversion of PDF content into image formats, including at least one of: the JPEG format for lossy compression, the PNG format for lossless compression, and the TIFF format for high-quality images with support for multiple layers and transparency. The one or more second users retain the flexibility to customize settings, including at least one of: image resolution, color depth, and compression levels, to provide a versatile and adaptable solution for converting PDFs into the one or more first images while maintaining fidelity and control.

The plurality of subsystems 110 further includes the page classification subsystem 214 that is communicatively connected to the one or more hardware processors 204. The page classification subsystem 214 is configured to classify the one or more first images associated with the one or more electronic documents as at least one of: the one or more second images including the one or more tabular data, and the one or more third images including the one or more non-tabular data, based on the convolutional neural network (CNN) based machine learning model. In an embodiment, a multi-layered CNN (e.g., the CNN based machine learning model) was trained from a scratch. The CNN based machine learning model is configured to utilize spatial features (e.g., 2D features) of the one or more first images for classifying the one or more first images into at least one of: a table-containing image (e.g., the one or more second images including the one or more tabular data) and a non-table image (e.g., the one or more third images including the one or more non-tabular data). The table-containing image category indicates that a page contains a table which may include the one or more financial statements. The non-table image category indicates that the page does not include any tables.

In another embodiment, the convolutional architecture of the CNN based machine learning model may not include any fully connected networks. A convolutional neural network (CNN) architecture without fully connected layers, also known as a fully convolutional network (FCN), which is configured to provide several advantages. FCNs excel at preserving spatial information throughout the network, making the fully convolutional network (FCN) ideal for tasks including semantic image segmentation, where maintaining the spatial structure is crucial. Further, the ability of the fully convolutional network (FCN) is to handle variable input sizes without resizing is advantageous, and the fully convolutional network (FCN) often incorporates global pooling layers to capture global information, making the fully convolutional network (FCN) suitable for tasks requiring holistic analysis of the input. These design choices provide greater flexibility for a wide range of data types and tasks, especially those benefiting from spatial preservation and pixel-wise classification.

For classifying the one or more first images associated with the one or more electronic documents based on the CNN based machine learning model, the page classification subsystem 214 is configured to preprocess the one or more first images associated with the one or more electronic documents. In an embodiment, the preprocessing of the one or more first images may include at least one of: standardizing the one or more formats of the one or more electronic documents, and resizing the one or more formats of the one or more electronic documents to one or more dimensions. The page classification subsystem 214 is further configured to obtain the preprocessed one or more first images at the convolutional neural network (CNN) based machine learning model. In an embodiment, the convolutional neural network (CNN) based machine learning model is a combination of one or more layers including at least one of: one or more convolutional layers, one or more pooling layers, one or more batch normalization layers, and one or more dropout layers.

The page classification subsystem 214 is further configured to classify the one or more first images associated with the one or more electronic documents as at least one of: the one or more second images including the one or more tabular data and the one or more third images including the one or more non-tabular data, by processing the preprocessed one or more first images based on the combination of the one or more layers of the convolutional neural network (CNN) based machine learning model. The processing of the preprocessed one or more first images based on the combination of the one or more layers of the convolutional neural network (CNN) based machine learning model, is given in a below table.

| One or more layers | Input | Output | Purpose/Objective of the one or more layers |
|---|---|---|---|
| Convolutional Layer | 224*224*1 vector image | 222*222*128 vector image | Extract basic features from an input image and produce a feature map. |
| Pooling Layer | 222*222*128 vector image | 111*111*128 vector image | Reduce height and width of the input image so the CNN based machine learning model can increase the depth of image and extract more features, to assist in reducing the computation time and memory. Features are preserved. |
| Batch Normalization Layer | 111*111*128 vector image | 111*111*128 vector image | Compresses weight values in between 0 to 1 so that the variance goes to next layers is less and the CNN based machine learning model can learn quickly and efficiently. The objective of this layer is to normalize for stability and faster training. |

-continued

| One or more layers | Input | Output | Purpose/Objective of the one or more layers |
|---|---|---|---|
| Convolutional Layer | 111*111*128 vector image | 109*109*128 vector image | Extract more features from the previous layer (e.g., the previous Batch Normalization Layer). |
| Pooling Layer | 109*109*128 vector image | 54*54*128 vector image | Same process is performed as previous pooling layer |
| Batch Normalization Layer | 54*54*128 vector image | 54*54*128 vector image | Same process is performed as previous normalization layer |
| Convolutional Layer | 54*54*128 vector image | 52*52*256 vector image | Same process is performed as previous convolutional layer |
| Pooling Layer | 52*52*256 vector image | 26*26*256 vector image | Same process is performed as previous pooling layer |
| Dropout Layer | 26*26*256 vector image | 26*26*256 vector image | Deactivate the random neurons so that the CNN based machine learning model does not learn from the noise. Also prevent overfitting during training. |
| Batch Normalization Layer | 26*26*256 vector image | 26*26*256 vector image | Same process is performed as previous normalization layer |
| Convolutional Layer | 26*26*256 vector image | 24*24*256 vector image | Same process is performed as previous convolutional layer |
| Pooling Layer | 24*24*256 vector image | 12*12*256 vector image | Same process is performed as previous pooling layer |
| Batch Normalization Layer | 12*12*256 vector image | 12*12*256 vector image | Same process is performed as previous normalization layer |
| Convolutional Layer | 12*12*256 vector image | 10*10*512 vector image | Same process is performed as previous convolutional layer |
| Pooling Layer | 10*10*512 vector image | 5*5*512 vector image | Same process is performed as previous pooling layer |
| Batch Normalization Layer | 5*5*512 vector image | 5*5*512 vector image | Same process is performed as previous normalization layer |
| Convolutional Layer | 5*5*512 vector image | 1*1*1 vector image | Same process is performed as the previous convolutional layer. Produce a classification decision. |
| Output | 1*1*1 | 1 | Provide output class. The output class is either of two classes: (1) a table-containing image class or (2) a non-table image class. |

In certain embodiments, before passing the one or more first images to CNN, the one or more first images are preprocessed for improving classification accuracy of the CNN based machine learning model. In an embodiment, the CNN based machine learning model obtains the preprocessed binary image input of shape 224×224×1 (image height*image width*number of channels).

In some embodiments, the batch normalization layer may be used in between the layers for normalizing the feature maps in order to reduce the internal covariate shift and speed up the training process. The "Internal Covariate Shift" as used herein is the change in the distribution of network activations due to the change in network parameters during training. In certain embodiments, dropout of 0.1 is used while training the CNN based machine learning model. The dropout is used to deactivate the 10% of the neurons in third layer, which in turn helps in reducing the overfitting of the CNN based machine learning model. In a non-limiting example, the CNN based machine learning model may be trained using 5,000 images which are classified into 2,750 non tabular images and 2,250 tabular images. The data have been balanced between the two classes to make sure the CNN based machine learning model is not biased towards a class.

In a non-limiting embodiment, for optimizing the CNN based machine learning model, a modified Root Mean Square Propagation (RMSProp) algorithm may be used. The RMSProp algorithm is an optimization algorithm commonly used in machine learning and deep learning models to adjust one or more learning rates (e.g., one or more first learning rates) for one or more individual parameters during training. The RMSProp algorithm is designed to address some of the limitations of a basic gradient descent method. The RMSProp determines one or more moving averages (e.g., one or more first moving averages) of one or more squared gradients (e.g., one or more first squared gradients) of loss function, which effectively normalizes the one or more learning rates for each parameter. This helps in overcoming the challenges posed by varying the one or more squared gradients across different dimensions and ensures that the one or more learning rates adapt to the specific requirements of each parameter. By doing so, the RMSProp algorithm is configured to accelerate convergence and stabilize the training process, making the RMSProp algorithm a popular choice for optimizing neural networks and other complex models.

In an embodiment, the RMSProp algorithm is modified such that weights are recentered around the mean along every dimension of the feature vectors. This modified RMSProp algorithm is used to train the CNN based machine learning model and to help for smoothening the loss landscape of the CNN based machine learning model, as a result the loss function may not be stuck at local minima and reaches to its optima. Unlike a traditional RMSProp, the modified RMSProp algorithm repositions the CNN based machine learning model's weights to be centered around the mean along each dimension of the feature vectors. This adjustment is designed to smoothen the loss landscape, making it less likely for the optimization process to get stuck at local minima during training. In each iteration, the modified RMSProp algorithm is configured to determine the gradients of the loss, updates the one or more moving averages of the one or more squared gradients, and determines the mean value along each dimension from the current mini-batch of feature vectors. The weight updates are then adjusted based on both the centered mean and the one or more moving averages of the one or more squared gradients, which helps the CNN based machine learning model to navigate the loss landscape more effectively. This modification is particularly valuable in this scenario, where avoiding local minima is crucial for achieving optimal model performance and convergence.

In certain embodiments, instead of 32 bit optimizers, the CNN based machine learning model is trained with 8 bit optimizers which helped in CNN based machine learning model generalization, reduced training time, reduced random access memory (RAM) to train the CNN based machine learning model. This approach helps in improving the generalization of the CNN based machine learning model while simultaneously reducing training time and memory requirements. The use of the 8-bit optimizers enhanced CNN based machine learning model generalization, resulting in the CNN based machine learning model performing well, not only on the training data but also on unseen or validation data. This improvement in generalization is attributed to various factors, including the potential for regularization techniques or the unique characteristics of the training data. Further, employing 8-bit precision in computations expedited the training process, as it demands fewer computational resources, allowing for faster parameter updates. Furthermore, the 8-bit optimizers significantly reduces the amount of memory required during training, which is particularly advantageous when working with large neural networks on hardware with limited resources.

The plurality of subsystems 110 further includes the table region determining subsystem 216 that is communicatively connected to the one or more hardware processors 204. The table region determining subsystem 216 is configured to determine the one or more tabular regions in the one or more tabular data associated with the one or more second images by identifying the one or more bounding box coordinates indicating the one or more tabular regions in the one or more tabular data associated with the one or more second images, based on the you only look once (YOLO) architecture based machine learning model. In an embodiment, the YOLO architecture based machine learning model may be a YOLO version 3 (V3) architecture based machine learning model In one embodiment, a 106 layered YOLO V3 architecture based machine learning model is retrained on 5000 images for detecting the one or more table regions in the one or more second images and the one or more second images are annotated using an annotation tool for training the YOLO architecture based machine learning model. In an embodiment, the YOLO architecture based machine learning model is trained on input images (e.g., the one or more second images) of shape 416*416*3. In such a scenario, instead of focusing on the spatial features, the network learns the structural information of the class. The image of any size may be given to the table region determining subsystem 216, but before passing into the table region determining subsystem 216 through the YOLO architecture based machine learning model, the one or more second images may be resized to 416*416.

For determining the one or more tabular regions in the one or more tabular data associated with the one or more second images based on the YOLO architecture based machine learning model, the table region determining subsystem 216 is configured to obtain the one or more second images associated with the one or more electronic documents. The table region determining subsystem 216 is further configured to preprocess the one or more second images by resizing the one or more second images.

The table region determining subsystem 216 is further configured to determine at least one of: a first sized tabular region (e.g., large table region) based on a first convolution stride (e.g., a convolution stride of 32 where the image size is 13×13) at a first layer model (e.g., $82^{nd}$ layer) of the you only look once (YOLO) architecture based machine learning model, a second sized tabular region (e.g., medium table region) based on a second convolution stride (e.g., a convolution stride of 16) at a second layer model (e.g., $94^{th}$ layer) of the you only look once (YOLO) architecture based machine learning model, and a third sized tabular region (e.g., small table region) based on a third convolution stride (e.g., a convolution stride of 8 where the image size is 52×52) at a third layer model (e.g., $106^{th}$ layer) of the you only look once (YOLO) architecture based machine learning model. The dividing of the table regions may help in handling the different sized table regions.

The table region determining subsystem 216 is further configured to identify the one or more bounding box coordinates indicating at least one of: the first sized tabular region, the second sized tabular region, and the third sized tabular region, in the one or more tabular data associated with the one or more second images. The table region determining subsystem 216 is further configured to generate one or more confidence scores to analyze confidence level of the you only look once (YOLO) architecture based machine learning model on the determination of at least one of: the first sized tabular region, the second sized tabular region, and the third sized tabular region. Upon determination of the table regions, the table region determining subsystem 216 is further configured to apply a non-maximum suppression technique for classifying one or more redundant bounding boxes to determine whether at least one of: the one or more tabular regions are accurate and the one or more tabular regions are non-overlapped.

In a non-limiting embodiment, for optimizing the YOLO architecture based machine learning model, a gradient centralized Root Mean Square Propagation (RMSProp) algorithm may be used. The RMSProp algorithm is an optimization algorithm commonly used in machine learning and deep learning models to adjust one or more learning rates (e.g., one or more second learning rates) for one or more individual parameters during training. The RMSProp algorithm is designed to address some of the limitations of a basic gradient descent method. The RMSProp determines one or more moving averages (e.g., one or more second moving averages) of one or more squared gradients (e.g., one or more second squared gradients) of loss function, which effectively normalizes the one or more learning rates for each parameter. This helps in overcoming the challenges posed by varying the one or more squared gradients across different dimensions and ensures that the one or more learning rates adapt to the specific requirements of each parameter. By doing so, the RMSProp algorithm is configured to accelerate convergence and stabilize the training process, making the RMSProp algorithm a popular choice for optimizing neural networks and other complex models.

In an embodiment, the RMSProp algorithm is modified such that weights are recentered around the mean along every dimension of the feature vectors. This modified RMSProp algorithm is used to train the YOLO architecture based machine learning model and to help for smoothening the loss landscape of the YOLO architecture based machine learning model, as a result the loss function may not be stuck at local minima and reaches to its optima. Unlike a traditional RMSProp, the gradient centralized RMSProp algorithm repositions the YOLO architecture based machine learning model's weights to be centered around the mean along each dimension of the feature vectors. This adjustment is designed to smoothen the loss landscape, making it less likely for the optimization process to get stuck at local minima during training. In each iteration, the gradient centralized RMSProp algorithm is configured to determine the gradients of the loss, updates the one or more moving averages of the one or more squared gradients, and determines the mean value along each dimension from the current mini-batch of feature vectors. The weight updates are then adjusted based on both the centered mean and the one or more moving averages of the one or more squared gradients, which helps the YOLO architecture based machine learning model to navigate the loss landscape more effectively. This modification is particularly valuable in this scenario, where avoiding local minima is crucial for achieving optimal model performance and convergence.

In certain embodiments, instead of 32 bit optimizers, the YOLO architecture based machine learning model is trained with 8 bit optimizers which helped in YOLO architecture based machine learning model generalization, reduced training time, reduced random access memory (RAM) to train the YOLO architecture based machine learning model. This approach helps in improving the generalization of the YOLO architecture based machine learning model while simultaneously reducing training time and memory requirements. The use of the 8-bit optimizers enhanced YOLO architecture based machine learning model generalization, resulting in the YOLO architecture based machine learning model performing well, not only on the training data but also on unseen or validation data. This improvement in generalization is attributed to various factors, including the potential for regularization techniques or the unique characteristics of the training data. Further, employing 8-bit precision in computations expedited the training process, as it demands fewer computational resources, allowing for faster parameter updates. Furthermore, the 8-bit optimizers significantly reduces the amount of memory required during training, which is particularly advantageous when working with large neural networks on hardware with limited resources.

As the table sizes are different in different electronic documents, Scale-Sensitive IOU Loss, helps the table region determining subsystem 216 in solving the problem of improper regression loss determination and slowing down of the optimization by adding Y-coordinate values to the basis of CIOU loss to adjust the loss values of the bounding boxes, which may distinguish all the bounding boxes quantitatively in theory thus gets a faster converging speed and better optimization.

In an embodiment, one or more hyperparameters optimized for the YOLO architecture based machine learning model, may include at least one of: learning rate, batch size, number of epochs, weight decay, IOU threshold, anchor boxes, grid size, number of output classes, loss function, image input size, and the like. The learning rate hyperparameter is configured to control the step size during an optimization process. In an embodiment, common learning rates may range from 0.1 to 0.0001, but the specific value may vary depending on a dataset and the optimizer. The batch size is configured to determine how many data samples are processed in each forward and backward pass during training. The batch size affects memory usage and training speed. In an embodiment, common values may range from 1 to 64 or higher. The number of epochs is configured to specify how many times the YOLO architecture based machine learning model goes through the entire training dataset. The choice of the number of epochs depends on the convergence of the YOLO architecture based machine learning model and may vary widely.

The weight decay (e.g., L2 Regularization) is configured to represent a regularization hyperparameter that helps in preventing overfitting. The weight decay is configured to control the strength of the L2 regularization term in the loss function. The IOU Threshold is configured to determine when a predicted bounding box is considered a true positive during training and evaluation. In an embodiment, common values may include 0.5 and 0.75. The anchor boxes hyperparameter is configured to predict the number of anchor boxes and their sizes. The YOLO architecture based machine learning model is configured to utilize the anchor boxes to predict object locations and sizes. The number of anchor boxes and their sizes are hyperparameters that need to be selected based on the dataset and object sizes.

The grid size hyperparameter is used in the YOLO architecture based machine learning model to divide the input image into a grid of cells. The size of this grid is a hyperparameter that can be adjusted based on the desired trade-off between precision and speed. The loss function hyperparameter is used. The choice of loss function including at least one of: mean squared error (MSE) and the custom loss function mentioned in the scale-sensitive IOU loss, is a significant hyperparameter. The image input size hyperparameter is used. This is the size to which the input images are resized before being fed into the YOLO architecture based machine learning model is an important hyperparameter. The Non-Maximum Suppression (NMS) Threshold is used as a hyperparameter. During post-processing, a threshold is set to filter out redundant bounding box predictions. The NMS threshold is a hyperparameter that controls this process.

The plurality of subsystems 110 further includes the data extraction subsystem 218 that is communicatively connected to the one or more hardware processors 204. The data extraction subsystem 218 is configured to extract the one or more first data associated with the one or more financial information from the one or more tabular regions determined from the one or more tabular data associated with the one or more second images, based on the optical character recognition (OCR) conversion process. In an embodiment, the data extraction subsystem 218 is a parameter driven rule engine. The data extraction process by the data extraction subsystem 218 begins with the detection of the one or more tabular regions within the one or more second images. Subsequently, an OCR conversion model is utilized to extract the one or more first data from the one or more tabular regions. In an embodiment, any industry-standard OCR model may be used for the data extraction process.

In an embodiment, the data extraction subsystem 218 is configured to arrange/organize the extracted one or more first data including one or more texts in one or more structured tables, based on a preprocessing model. For arranging the extracted one or more first data including the one or more texts in the one or more structured tables, the data extraction subsystem 218 is configured to sort the one or more texts in a descending order based on one or more Y-coordinate values. The one or more texts are sorted to align the one or more texts in one or more rows. In other words, the one or more texts are sorted in the descending order based on the Y-coordinate values, which serves to align one or more text elements in a way that facilitates the formation of the one or more rows.

The data extraction subsystem 218 with the preprocessing model is further configured to identify the one or more rows by determining an absolute difference between one or more consecutive Y-coordinate values. The data extraction subsystem 218 with the preprocessing model is further configured to determine whether the one or more rows are last rows. The data extraction subsystem 218 with the preprocessing model is further configured to add the one or more Y-coordinate values at a previous row, to a new list when one or more Y-coordinate differences are equal to a predetermined value (e.g., 1). The data extraction subsystem 218 with the preprocessing model is further configured to fragment the one or more rows across the one or more texts upon addition of the one or more Y-coordinate values at the previous row, to the new list.

In a non-limiting example, in cases where the Y-coordinate difference for the current row is equal to 1 but does not meet the aforementioned conditions, indicating a change in the sequence, further steps are taken. Specifically, it checks whether the current Y-coordinate matches the Y-coordinates of both the previous and next words. If the one or more current Y-coordinate values match the previous word's Y-coordinate values, adjustments are made to align the one or more Y-coordinate values. The same alignment is carried out for the next word's Y-coordinate values. However, if the one or more current Y-coordinate values differs from both the previous and next words, the preprocessing model is configured to determine the difference between the one or more current Y-coordinate values and the one or more Y-coordinate values of both the previous and next words. Subsequently, the one or more Y-coordinate values are adjusted to match the closer of the two adjacent words' Y-coordinate values.

Following the processing of Y-coordinate values, the one or more first data are grouped based on these values, resulting in the extraction of words belonging to the same row. Finally, at the column level, text elements with a spacing distance greater than two spaces are separated, allowing for the identification of column boundaries. This comprehensive approach effectively transforms unstructured text extracted through the OCR model into organized, tabular data, suitable for further analysis or utilization.

The data extraction subsystem 218 is further configured to extract the one or more second data associated with the one or more financial information from the one or more non-tabular regions determined from the one or more non-tabular data associated with the one or more third images, based on the optical character recognition (OCR) conversion process. In an embodiment, the extracted one or more second data are configured to provide the one or more contexts to the one or more tabular data associated with the one or more second images. The area above the table is represented as the non-tabular region and is included with the tabular region for further analysis, aiding in contextual comprehension. The extraction of the one or more second data is performed by the OCR model. In an embodiment, any industry-standard OCR model may be used for the extraction purposes.

In an embodiment, for providing the one or more contexts associated with the one or more second data, to the one or more tabular data, the data extraction subsystem 218 is configured to split the one or more phrases associated with the one or more second data, into one or more individual words. The data extraction subsystem 218 is further configured to preprocess the one or more individual words. In an embodiment, preprocessing the one or more individual words comprise at least one of: converting the one or more individual words to lowercases, eliminating one or more common stop words, and removing one or more extraneous data from the one or more individual words.

The data extraction subsystem 218 is further configured to determine one or more types of tables in the one or more electronic documents by comparing the preprocessed one or more individual words with one or more prestored keywords stored in the one or more databases 108, based on content-based keyword search technique. In an embodiment, the data extraction subsystem 218 is further configured to utilize "difflib" library to compare the preprocessed one or more individual words with the one or more prestored keywords. The data extraction subsystem 218 is further configured to classify the one or more types of tables in the one or more electronic documents by generating one or more similarity scores based on the comparison of the preprocessed one or more individual words with the one or more prestored keywords. The one or more similarity scores indicate one or more similarities among the one or more prestored keywords to classify the one or more types of tables.

The data extraction subsystem 218 is further configured to determine the multiplier used in the one or more financial documents, whether it's in thousands, millions, billions, or any another denomination based on the content-based keyword search technique. The data extraction subsystem 218 is further configured to identify information related to one or more currencies in the one or more financial documents, based on the content-based keyword search technique, encompassing both text and symbol recognition. The one or more currencies may include at least one of: USD, EUR, or symbols including $. The content-based keyword search technique is configured to operate on text extracted, not only from the non-tabular region but also from the tabular region. The identification relies on a pre-established list of keywords and symbols, ensuring precise detection.

The plurality of subsystems 110 includes the output subsystem 220 that is communicatively connected to the one or more hardware processors 204. The table region determining subsystem 216 is configured to provide the output of at least one of: the one or more first data extracted from the one or more tabular regions and the one or more second data extracted from the one or more non-tabular regions, to one or more second users on the user interface associated with one or more electronic devices 102. In an embodiment, the output subsystem 220 is configured to update one or more database records pertaining to the one or more financial statements. In another embodiment, a format of the one or more data output (e.g., the one or more first data and the one or more second data) generated may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like.

The plurality of subsystems 110 includes the training subsystem 222 that is communicatively connected to the one or more hardware processors 204. The training subsystem 222 is configured to receive new data related to the one or more financial statements over time. The new data is added to the original training dataset by combining the new data with the existing data, which generates updated training dataset. The updated training dataset may include both the old and new data points. Subsequently, the same training process is followed, which includes continuous evaluation and tuning to assess the quality of the mappings and iteratively improving the results if necessary. The steps are repeated for a fixed number of iterations until the ML-based computing system 104 identifies the data points from the one or more financial statements with sufficient accuracy. Thereafter, the changes are implemented to the ML-based computing system 104, and new data parsing and extractions take place with the updated computing system.

FIG. 3 is an overall process flow 300 of automatic extraction of the one or more data from the one or more electronic documents, in accordance with another embodiment of the present disclosure. At step 302, the one or more electronic documents are received from the one or more data sources.

At step 304, each page of the one or more electronic documents in the one or more formats is converted into the one or more first images if the one or more electronic documents are not in image format. At step 306, the one or more first images are classified as the one or more second images including the one or more tabular data, and the one or more third images including the one or more non-tabular data based on the CNN based machine learning model. At step 308, the one or more second images including the one or more tabular data are involved for further processing. At step 310, no further processes are performed for the one or more third images including the one or more non-tabular data.

At step 312, the one or more tabular regions are determined in the one or more tabular data associated with the one or more second images by identifying the one or more bounding box coordinates indicating the one or more tabular regions in the one or more tabular data associated with the one or more second images, based on the YOLO architecture based machine learning model. At step 314, the one or more first data associated with the one or more financial information are extracted from the one or more tabular regions based on the optical character recognition (OCR) conversion process.

At step 316, the one or more second data associated with the one or more financial information are extracted from one or more non-tabular regions, based on the optical character recognition (OCR) conversion process. At step 318, the output of at least one of: the one or more first data and the one or more second data, is provided to the one or more second users on the user interface associated with the one or more electronic devices 102.

FIG. 4 is a process flow 400 of training the convolutional neural network (CNN) based machine learning model to classify the one or more first images as the one or more second images including the one or more tabular data, and the one or more third images including the one or more non-tabular data, in accordance with an embodiment of the present disclosure. At step 402, one or more first datasets associated with the one or more first images are obtained for training the CNN based machine learning model, by the training subsystem 222. In an embodiment, the one or more first datasets should be carefully curated to include diverse examples of both the one or more second images including the one or more tabular data and the one or more third images including the one or more non-tabular data.

At step 404, the one or more first images associated with the one or more electronic documents are preprocessed. The preprocessing of the one or more first images standardizing image formats, resizing the one or more first images to specific dimensions (e.g., 224×224×1) to prepare the data for inputting to the CNN based machine learning model. At step 406, the one or more first images in the one or more first datasets, are labelled as the one or more second images including the one or more tabular data, and the one or more third images including the one or more non-tabular data.

At step 408, the one or more first datasets are segmented into at least one of: one or more first training datasets and one or more first validation datasets. At step 410, the convolutional neural network (CNN) based machine learning model is trained to classify the one or more first images as the one or more second images including the one or more tabular data, and the one or more third images including the one or more non-tabular data by: (a) obtaining the one or more first images and one or more labels corresponding to the one or more first images, at the convolutional neural network (CNN) based machine learning model, and (b) updating one or more first hyperparameters to learn one or more patterns for accurately classifying the one or more first images as the one or more second images comprising the one or more tabular data, and the one or more third images comprising the one or more non-tabular data, based on a root mean square propagation model.

In an embodiment, the one or more first hyperparameters include at least one of: learning rates, batch sizes, and architectural parameters. The root mean square propagation model is configured to compute the one or more first moving averages of the one or more first squared gradients of one or more first loss functions to normalize the one or more first learning rates for the one or more first hyperparameters during the training of the convolutional neural network (CNN) based machine learning model.

At step 412, the convolutional neural network (CNN) based machine learning model is validated based on the one or more first validation datasets by determining whether at least one of: the convolutional neural network (CNN) based machine learning model learns the one or more patterns and the convolutional neural network (CNN) based machine learning model is having risk of overfitting, based on one or more first metrics comprising accuracy metric and loss metric. At step 414, the one or more first hyperparameters are adjusted to fine-tune the convolutional neural network (CNN) based machine learning model based on one or more first results of validation of the convolutional neural network (CNN) based machine learning model.

At step 416, the convolutional neural network (CNN) based machine learning model is re-trained over a plurality of time intervals based on one or more first training data, by: (a) receiving the one or more first training data over the plurality of first time intervals, as shown in step 416, (b) adding the one or more first training data with the one or more first training datasets to generate one or more updated first training datasets, as shown in step 418, (c) re-training the convolutional neural network (CNN) based machine learning model based on the one or more updated first training datasets, as shown in step 420, and (d) executing the re-trained convolutional neural network (CNN) based machine learning model in the page classification subsystem 214 to classify the one or more first images as the one or more second images including the one or more tabular data, and the one or more third images including the one or more non-tabular data, as shown in step 422.

FIG. 5 is a process flow 500 of training the you only look once (YOLO) architecture based machine learning model to determine the one or more tabular regions in the one or more tabular data associated with the one or more second images, in accordance with an embodiment of the present disclosure. At step 502, one or more second datasets associated with the one or more second images are obtained for training the you only look once (YOLO) architecture based machine learning model. In an embodiment, the one or more second images need to encompass a diverse range of scenarios, layouts, and document types to ensure robust performance.

At step 504, one or more features are selected to determine the one or more tabular regions in the one or more tabular data associated with the one or more second images. The one or more features may include at least one of: one or more patterns, one or more structural information, and one or more visual information, related to the one or more tabular regions. At step 506, the one or more second images are labelled by marking the one or more bounding box coordinates indicating one or more locations of the one or more tabular regions in the one or more tabular data associated with the one or more second images.

At step 508, the one or more second datasets are segmented into at least one of: one or more second training datasets and one or more second validation datasets. At step 510, the you only look once (YOLO) architecture based machine learning model is trained to determine the one or more tabular regions based on one or more second hyperparameters and weights. In an embodiment, The training process involves forward and backward passes through the network and the minimization of a chosen loss function. In an embodiment, the one or more second hyperparameters include at least one of: learning rate, rho, momentum, epsilon, centered, name, weight_decay, clipnorm, clipvalue, global_clipnorm, use_ema, ema_momentum, and ema_overwrite_frequency.

The learning rate hyperparameter is configured to set initial value for the learning rate, which controls the step size in the optimization process. The learning rate hyperparameter may be a floating-point value or a schedule for dynamic learning rates. The rho hyperparameter is a discounting factor for the old gradients in the optimizer. The rho hyperparameter is configured to determine how much importance is given to previous gradient information when updating model weights. A lower value makes older gradients less significant. The momentum hyperparameter allows the optimizer to track the momentum value if the momentum hyperparameter is not set to 0.0. This affects the update of model weights. The momentum value decays with a rate of 1-momentum.

The epsilon hyperparameter is a small constant added to prevent numerical instability during optimization. The epsilon hyperparameter is used to avoid division by zero or extremely small values. The centered hyperparameter is a Boolean parameter that, when set to true, normalizes gradients by the estimated variance of the gradient. When False, it uses uncentered second moments for normalization. In an embodiment, the centered hyperparameter may be set to true may help with training. The name hyperparameter is used as the name for momentum accumulator weights created by the optimizer. The name hyperparameter is helpful for identifying optimizer-specific variables in the YOLO architecture based machine learning model.

The weight_decay hyperparameter is configured to specify a weight decay to apply during optimization when the weight_decay hyperparameter is set. The weight_decay hyperparameter assists in preventing overfitting by penalizing large weight values. The clipnorm hyperparameter is configured to limits the norm of the gradient of each weight. If the gradient norm exceeds this value, it is clipped to prevent it from becoming too large during optimization. The clipvalue hyperparameter is configured to set a threshold for the gradient of each weight. If a gradient value exceeds this threshold, it is clipped to ensure it doesn't grow too large during optimization.

The global_clipnorm hyperparameter is similar to the clipnorm, but the global_clipnorm hyperparameter clips the global norm of all weights' gradients. The global_clipnorm hyperparameter assists in preventing an explosion of gradients across all model parameters. The use_ema hyperparameter is a Boolean parameter set to true to enable the application of exponential moving average (EMA) on the model's weights. EMA is a method for smoothing weight updates during training, which can improve model stability.

The ema_momentum hyperparameter is used when the use_ema hyperparameter is true. The ema_momentum hyperparameter is configured to determine the momentum for computing the EMA of the model's weights. The ema_momentum hyperparameter is configured to control the balance between the current weight value and the moving average of weights. The ema_overwrite_frequency hyperparameter is used when the use_ema is hyperparameter is true. The ema_overwrite_frequency hyperparameter is configured to specify how often the model's weights should be overwritten with their EMA values. The ema_overwrite_frequency hyperparameter is configured to affect the frequency at which the EMA is applied to the YOLO architecture based machine learning model.

At step 512, the you only look once (YOLO) architecture based machine learning model is validated based on the one or more second validation datasets by determining whether the you only look once (YOLO) architecture based machine learning model accurately determines the one or more tabular regions based on one or more second metrics. In an embodiment, the one or more second metrics may include at least one of: precision metric, recall metric, F1-score metric, and the like. At step 514, the one or more second hyperparameters are adjusted to fine-tune the you only look once (YOLO) architecture based machine learning model based on one or more second results of validation of the you only look once (YOLO) architecture based machine learning model.

At step 516, the you only look once (YOLO) architecture based machine learning model is re-trained over a plurality of second time intervals based on one or more second training data, by: (a) receiving the one or more second training data over the plurality of second time intervals, as shown in step 516, (b) adding the one or more second training data with the one or more second training datasets to generate one or more updated second training datasets, as shown in step 518, (c) re-training the you only look once (YOLO) architecture based machine learning model based on the one or more updated second training datasets, as shown in step 520, and (d) executing the re-trained you only look once (YOLO) architecture based machine learning model in the table region determining subsystem 216 to determine the one or more bounding box coordinates indicating the one or more tabular regions in the one or more tabular data associated with the one or more second images, as shown in step 522.

FIG. 6 is an exemplary representation 600 depicting the classification of the one or more first images associated with the one or more electronic documents as at least one of: the one or more second images including the one or more tabular data, and the one or more third images including the one or more non-tabular data, in accordance with an embodiment of the present disclosure. The trained convolutional neural network (CNN) based machine learning model in the page classification subsystem 214 obtains the one or more first images as an input (as shown in 602) and classifies the one or more first images (604, 606) into at least one of: the one or more second images including the one or more tabular data 610, and the one or more third images including the one or more non-tabular data 608. As a non-limiting example, the one or more first images 604 are classified by the page classification subsystem 214 as the one or more third images with the non-tabular image/data 608, while the one or more first images 606 are classified by the page classification subsystem 214 as the one or more second images with the tabular image/data 610.

FIG. 7 is an exemplary representation 700 depicting the determination of the one or more tabular regions 704 in the one or more tabular data associated with the one or more second images, in accordance with an embodiment of the present disclosure. The trained YOLO v3 architecture-based machine learning model in the table region determining subsystem 216 is configured to obtain a table-containing image and to determine the bounding box coordinates that indicate the tabular region 704 in the table-containing image. The first data in the tabular region 704 are further processed by the data extraction subsystem 218, while the second data in the non-tabular region (702, 706) are processed further by the data extraction subsystem 218.

Figure 8A:
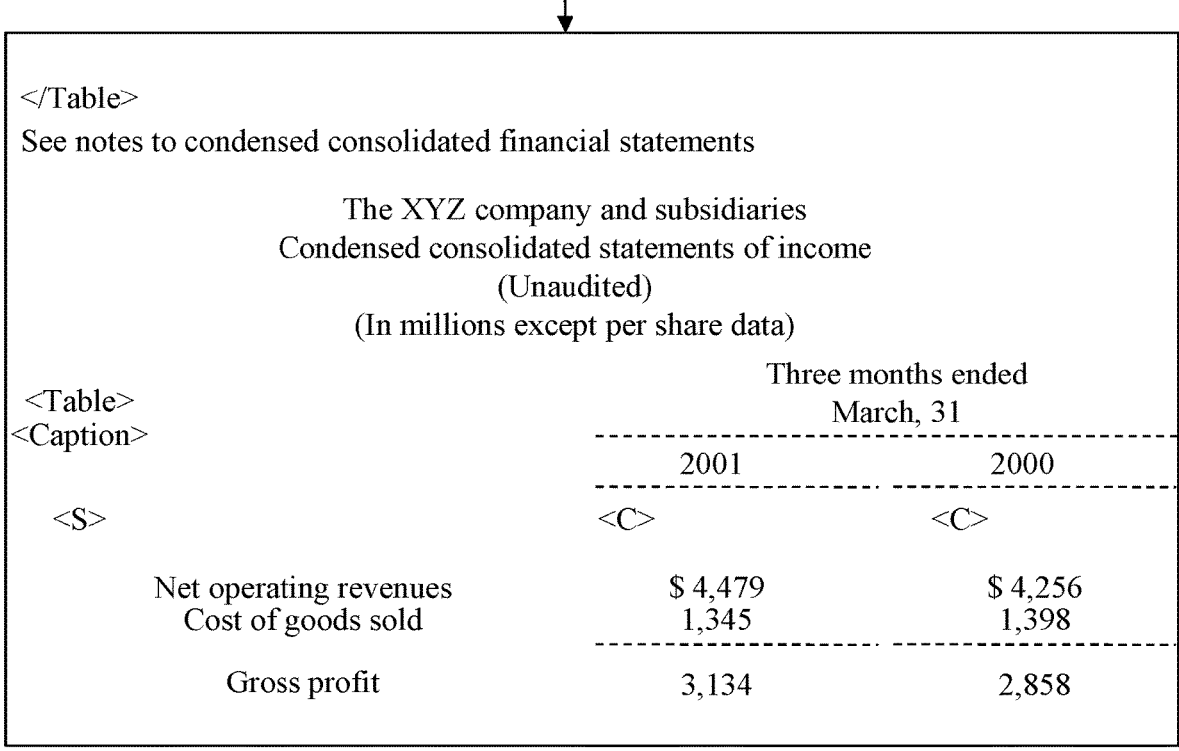

As a non-limiting example, the YOLO v3 architecture-based machine learning model is configured to determine the bounding box coordinates for the tabular region 704. The first data in the tabular region 704 is further processed by the data extraction subsystem 218, while the second data in the non-tabular region (702, 706) are processed further by the data extraction subsystem 218. In FIG. 7, the circular symbol with "A" written inside is being used as an off-page connector. This is used for indicating that FIG. 7 continues in the next page FIGS. 8A-8C are exemplary representations (800A, 800B, 800C) depicting inputs and outputs of the ML-based computing system 104, in accordance with another embodiment of the present disclosure. The ML-based computing system 104 is configured to obtain the one or more first images 802 and to classify the one or more first images as the one or more second images including the one or more tabular data (804, 806), as shown in FIGS. 8B-8C. In FIG. 8A, the circular symbol with "A" written inside is being used as an off-page connector. This is used for indicating that FIG. 8A continues in the next page. In FIG. 8B, the circular symbol with "A" written inside is being used as an off-page connector. This is used for indicating that FIG. 8B continues in the next page.

FIGS. 9A-9B are exemplary representations (900A, 900B) depicting the inputs and outputs of the ML-based computing system 104, in accordance with another embodiment of the present disclosure. The ML-based computing system 104 is configured to obtain the one or more first images 902 and to classify the one or more first images 902 as the one or more second images including the one or more tabular data 904, as shown in FIG. 9B. In FIG. 9A, the circular symbol with "A" written inside is being used as an off-page connector. This is used for indicating that FIG. 9A continues in the next page. In FIG. 9B, the circular symbol with "A" written inside is being used as an off-page connector. This is used for indicating that FIG. 9B continues in the next page FIG. 10 is an flow chart illustrating a machine-learning based (ML-based) computing method 1000 for extracting the one or more data from the one or more electronic documents, in accordance with an embodiment of the present disclosure. At step 1002, the one or more electronic documents are received from the one or more data sources.

At step 1004, each page of the one or more electronic documents in the one or more formats is converted into the one or more first images if the one or more electronic documents are not in image format. At step 1006, the one or more first images are classified as the one or more second images including the one or more tabular data, and the one or more third images including the one or more non-tabular data based on the CNN based machine learning model.

At step 1008, the one or more tabular regions are determined in the one or more tabular data associated with the one or more second images by identifying the one or more bounding box coordinates indicating the one or more tabular regions in the one or more tabular data associated with the one or more second images, based on the YOLO architecture based machine learning model. At step 1010, the one or more first data associated with the one or more financial information are extracted from the one or more tabular regions based on the optical character recognition (OCR) conversion process.

At step 1012, the one or more second data associated with the one or more financial information are extracted from one or more non-tabular regions, based on the optical character recognition (OCR) conversion process. In an embodiment, the extracted one or more second data are configured to provide one or more contexts to the one or more tabular data associated with the one or more second images.

At step 1014, the output of at least one of: the one or more first data and the one or more second data, is provided to the one or more second users on the user interface associated with the one or more electronic devices 102. In FIG. 10, the circular symbol with "A" written inside is being used as an off-page connector. This is used for indicating that FIG. 10 continues in the next page.

The present invention has the following advantages. The present invention with the ML-based computing system 104 is configured to automatically extract the one or more data from the one or more electronic documents (e.g., the one or more financial documents). The ML-based computing system 104 is tested on a diverse set of about 2200 financial documents in English, Swedish, Norwegian, and Portuguese languages. The one or more electronic documents had various template structures, incomplete data, missing headers, and misalignment issues. The present invention is configured to evaluate the model performance in realistic scenarios.

The pipeline achieved an average capture rate of 90% for extracting financial data from the one or more electronic documents. The processing time for each electronic document depended on the number of pages and tables in the one or more electronic documents. The following are some examples of the average processing time using a 32 GB RAM and 8 core central processing unit (CPU) Environment: (a) a 15-page electronic document took about 250 seconds to process, (b) a 30-page electronic document took about 480 seconds to process, (c) a 140-page electronic document took about 660 seconds to process, and (d) a 203-page electronic document took about 800 seconds to process.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for extracting one or more data from one or more electronic documents, the ML-based computing method comprising:

receiving, by one or more hardware processors, the one or more electronic documents from one or more data sources comprising at least one of: one or more databases, one or more electronic mails and one or more application programming interfaces, wherein the one or more electronic documents are associated with one or more financial statements comprising at least one of: one or more balance sheets, one or more income statements, and one or more cash flow statements, of one or more first users;

converting, by the one or more hardware processors, one or more formats of the one or more electronic documents into one or more first images associated with the one or more electronic documents;

classifying, by the one or more hardware processors, the one or more first images associated with the one or more electronic documents as at least one of: one or more second images comprising one or more tabular data, and one or more third images comprising one or more non-tabular data, based on a convolutional neural network (CNN) based machine learning model;

determining, by the one or more hardware processors, one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model;

extracting, by the one or more hardware processors, one or more first data associated with one or more financial information from the one or more tabular regions determined from the one or more tabular data associated with the one or more second images, based on an optical character recognition (OCR) conversion process;

extracting, by the one or more hardware processors, one or more second data associated with the one or more financial information from one or more non-tabular regions determined from the one or more non-tabular data associated with the one or more third images, based on the optical character recognition (OCR) conversion process, wherein the extracted one or more second data are configured to provide one or more contexts to the one or more tabular data associated with the one or more second images; and providing, by the one or more hardware processors, an output of at least one of: the one or more first data extracted from the one or more tabular regions and the one or more second data extracted from the one or more non-tabular regions, to one or more second users on a user interface associated with one or more electronic devices.

2. The machine-learning based (ML-based) computing method of claim 1, wherein converting the one or more formats of the one or more electronic documents into the one or more first images associated with the one or more electronic documents, comprises:

determining, by the one or more hardware processors, whether the one or more first images indicate one or more visual appearances of the one or more formats of the one or more electronic documents, by parsing one or more contents associated with the one or more electronic documents for interpreting the one or more contents of each page of the one or more electronic documents, wherein the one or more contents comprise at least one of: one or more texts, one or more graphics, and one or more layout elements, associated with the one or more electronic documents; and upon determining whether the one or more first images indicate the one or more visual appearances of the one or more formats of the one or more electronic documents, converting, by the one or more hardware processors, the one or more formats of the one or more contents into the one or more first images associated with the one or more electronic documents.

3. The machine-learning based (ML-based) computing method of claim 1, wherein classifying, by the convolutional neural network (CNN) based machine learning model, the one or more first images associated with the one or more electronic documents, comprises:

preprocessing, by the one or more hardware processors, the one or more first images associated with the one or more electronic documents, wherein preprocessing the one or more first images comprises at least one of: standardizing the one or more formats of the one or more electronic documents, and resizing the one or more formats of the one or more electronic documents to one or more dimensions;

obtaining, by the one or more hardware processors, the preprocessed one or more first images at the convolutional neural network (CNN) based machine learning model, wherein the convolutional neural network (CNN) based machine learning model is a combination of one or more layers comprising at least one of: one or more convolutional layers, one or more pooling layers, one or more batch normalization layers, and one or more dropout layers; and classifying, by the one or more hardware processors, the one or more first images associated with the one or more electronic documents as at least one of: the one or more second images comprising the one or more tabular data and the one or more third images comprising the one or more non-tabular data, by processing the preprocessed one or more first images based on the combination of the one or more layers of the convolutional neural network (CNN) based machine learning model.

4. The machine-learning based (ML-based) computing method of claim 3, further comprising training, by the one or more hardware processors, the convolutional neural network (CNN) based machine learning model, by:

obtaining, by the one or more hardware processors, one or more first datasets associated with the one or more first images for training the convolutional neural network (CNN) based machine learning model;

preprocessing, by the one or more hardware processors, the one or more first images associated with the one or more electronic documents;

labelling, by the one or more hardware processors, the one or more first images in the one or more first datasets, as the one or more second images comprising the one or more tabular data, and the one or more third images comprising the one or more non-tabular data;

segmenting, by the one or more hardware processors, the one or more first datasets into at least one of: one or more first training datasets and one or more first validation datasets;

training, by the one or more hardware processors, the convolutional neural network (CNN) based machine learning model to classify the one or more first images as the one or more second images comprising the one or more tabular data, and the one or more third images comprising the one or more non-tabular data, by:

obtaining, by the one or more hardware processors, the one or more first images and one or more labels corresponding to the one or more first images, at the convolutional neural network (CNN) based machine learning model; and updating, by the one or more hardware processors, one or more first hyperparameters to learn one or more patterns for accurately classifying the one or more first images as the one or more second images comprising the one or more tabular data, and the one or more third images comprising the one or more non-tabular data, based on a root mean square propagation model, wherein the one or more first hyperparameters comprise at least one of: learning rates, batch sizes, and architectural parameters, and wherein the root mean square propagation model is configured to compute one or more first moving averages of one or more first squared gradients of one or more first loss functions to normalize one or more first learning rates for the one or more first hyperparameters during the training of the convolutional neural network (CNN) based machine learning model;

validating, by the one or more hardware processors, the convolutional neural network (CNN) based machine learning model based on the one or more first validation datasets by determining, by the one or more hardware processors, whether at least one of: the convolutional neural network (CNN) based machine learning model learns the one or more patterns and the convolutional neural network (CNN) based machine learning model is having risk of overfitting, based on one or more first metrics comprising accuracy metric and loss metric; and adjusting, by the one or more hardware processors, the one or more first hyperparameters to fine-tune the convolutional neural network (CNN) based machine learning model based on one or more first results of validation of the convolutional neural network (CNN) based machine learning model.

5. The machine-learning based (ML-based) computing method of claim 4, further comprising re-training, by the one or more hardware processors, the convolutional neural network (CNN) based machine learning model over a plurality of time intervals based on one or more first training data, wherein re-training the convolutional neural network (CNN) based machine learning model over the plurality of first time intervals comprises:

receiving, by the one or more hardware processors, the one or more first training data over the plurality of first time intervals;

adding, by the one or more hardware processors, the one or more first training data with the one or more first training datasets to generate one or more updated first training datasets;

re-training, by the one or more hardware processors, the convolutional neural network (CNN) based machine learning model based on the one or more updated first training datasets; and executing, by the one or more hardware processors, the re-trained convolutional neural network (CNN) based machine learning model in a page classification subsystem to classify the one or more first images as the one or more second images comprising the one or more tabular data, and the one or more third images comprising the one or more non-tabular data.

6. The machine-learning based (ML-based) computing method of claim 1, wherein determining, by the you only look once (YOLO) architecture based machine learning model, the one or more tabular regions in the one or more tabular data associated with the one or more second images, comprises:

obtaining, by the one or more hardware processors, the one or more second images associated with the one or more electronic documents;

preprocessing, by the one or more hardware processors, the one or more second images by resizing the one or more second images;

determining, by the one or more hardware processors, at least one of: a first sized tabular region based on a first convolution stride at a first layer model of the you only look once (YOLO) architecture based machine learning model, a second sized tabular region based on a second convolution stride at a second layer model of the you only look once (YOLO) architecture based machine learning model, and a third sized tabular region based on a third convolution stride at a third layer model of the you only look once (YOLO) architecture based machine learning model;

identifying, by the one or more hardware processors, the one or more bounding box coordinates indicating at least one of: the first sized tabular region, the second sized tabular region, and the third sized tabular region, in the one or more tabular data associated with the one or more second images;

generating, by the one or more hardware processors, one or more confidence scores to analyze confidence level of the you only look once (YOLO) architecture based machine learning model on the determination of at least one of: the first sized tabular region, the second sized tabular region, and the third sized tabular region; and applying, by the one or more hardware processors, a non-maximum suppression technique for classifying one or more redundant bounding boxes to determine whether at least one of: the one or more tabular regions are accurate and the one or more tabular regions are non-overlapped.

7. The machine-learning based (ML-based) computing method of claim 1, wherein training, by the one or more hardware processors, the you only look once (YOLO) architecture based machine learning model, by:

obtaining, by the one or more hardware processors, one or more second datasets associated with the one or more second images for training the you only look once (YOLO) architecture based machine learning model;

selecting, by the one or more hardware processors, one or more features to determine the one or more tabular regions in the one or more tabular data associated with the one or more second images, wherein the one or more features comprise at least one of: one or more patterns, one or more structural information, and one or more visual information, related to the one or more tabular regions;

labelling, by the one or more hardware processors, the one or more second images by marking the one or more bounding box coordinates indicating one or more locations of the one or more tabular regions in the one or more tabular data associated with the one or more second images;

segmenting, by the one or more hardware processors, the one or more second datasets into at least one of: one or more second training datasets and one or more second validation datasets;

training, by the one or more hardware processors, the you only look once (YOLO) architecture based machine learning model to determine the one or more tabular regions based on one or more second hyperparameters and weights, wherein the one or more second hyperparameters comprise at least one of: learning rate, rho, momentum, epsilon, centered, name, weight_decay, clipnorm, clipvalue, global_clipnorm, use_ema, ema_momentum, and ema_overwrite_frequency, and wherein the root mean square propagation model is configured to compute one or more second moving averages of one or more second squared gradients of one or more second loss functions to normalize one or more second learning rates for the one or more second hyperparameters during the training of the you only look once (YOLO) architecture based machine learning model;

validating, by the one or more hardware processors, the you only look once (YOLO) architecture based machine learning model based on the one or more second validation datasets by determining whether the you only look once (YOLO) architecture based machine learning model accurately determines the one or more tabular regions based on one or more second metrics, wherein the one or more second metrics comprise at least one of: precision metric, recall metric, and F1-score metric; and adjusting, by the one or more hardware processors, the one or more second hyperparameters to fine-tune the you only look once (YOLO) architecture based machine learning model based on one or more second results of validation of the you only look once (YOLO) architecture based machine learning model.

8. The machine-learning based (ML-based) computing method of claim 7, further comprising re-training, by the one or more hardware processors, the you only look once (YOLO) architecture based machine learning model over a plurality of second time intervals based on one or more second training data, wherein re-training the you only look once (YOLO) architecture based machine learning model over the plurality of second time intervals comprises:

receiving, by the one or more hardware processors, the one or more second training data over the plurality of second time intervals;

adding, by the one or more hardware processors, the one or more second training data with the one or more second training datasets to generate one or more updated second training datasets;

re-training, by the one or more hardware processors, the you only look once (YOLO) architecture based machine learning model based on the one or more updated second training datasets; and executing, by the one or more hardware processors, the re-trained you only look once (YOLO) architecture based machine learning model in a table region determining subsystem to determine the one or more bounding box coordinates indicating the one or more tabular regions in the one or more tabular data associated with the one or more second images.

9. The machine-learning based (ML-based) computing method of claim 1, further comprising arranging, by the one or more hardware processors, the extracted one or more first data comprising one or more texts in one or more structured tables, based on a preprocessing model, by:

sorting, by the one or more hardware processors, the one or more texts in a descending order based on one or more Y-coordinate values, wherein the one or more texts are sorted to align the one or more texts in one or more rows;

identifying, by the one or more hardware processors, the one or more rows by determining an absolute difference between one or more consecutive Y-coordinate values;

determining, by the one or more hardware processors, whether the one or more rows are last rows;

adding, by the one or more hardware processors, the one or more Y-coordinate values at a previous row, to a new list when one or more Y-coordinate differences are equal to a predetermined value; and fragmenting, by the one or more hardware processors, the one or more rows across the one or more texts upon addition of the one or more Y-coordinate values at the previous row, to the new list.

10. The machine-learning based (ML-based) computing method of claim 1, wherein providing, by the one or more hardware processors, the one or more contexts associated with the one or more second data, to the one or more tabular data, by:

splitting, by the one or more hardware processors, the one or more phrases associated with the one or more second data, into one or more individual words;

preprocessing, by the one or more hardware processors, the one or more individual words, wherein preprocessing the one or more individual words comprise at least one of: converting the one or more individual words to lowercases, eliminating one or more common stop words, and removing one or more extraneous data from the one or more individual words;

determining, by the one or more hardware processors, one or more types of tables in the one or more electronic documents by comparing the preprocessed one or more individual words with one or more prestored keywords stored in one or more databases, based on content-based keyword search technique; and classifying, by the one or more hardware processors, the one or more types of tables in the one or more electronic documents by generating one or more similarity scores based on the comparison of the preprocessed one or more individual words with the one or more prestored keywords, wherein the one or more similarity scores indicate one or more similarities among the one or more prestored keywords to classify the one or more types of tables.

11. A machine learning based (ML-based) computing system for extracting one or more data from one or more electronic documents, the ML-based computing system comprising:

one or more hardware processors;

a memory coupled to the one or more hardware processors, wherein the memory comprises a plurality of subsystems in the form of programmable instructions executable by the one or more hardware processors, and wherein the plurality of subsystems comprises:

a document acquisition subsystem configured to receive the one or more electronic documents from one or more data sources comprising at least one of: one or more databases, one or more electronic mails and one or more application programming interfaces, wherein the one or more electronic documents are associated with one or more financial statements comprising at least one of: one or more balance sheets, one or more income statements, and one or more cash flow statements, of one or more first users;

a document conversion subsystem configured to convert one or more formats of the one or more electronic documents into one or more first images associated with the one or more electronic documents;

a page classification subsystem configured to classify the one or more first images associated with the one or more electronic documents as at least one of: one or more second images comprising one or more tabular data, and one or more third images comprising one or more non-tabular data, based on a convolutional neural network (CNN) based machine learning model;

a table region determining subsystem configured to determine one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model;

a data extraction subsystem configured to:

extract one or more first data associated with one or more financial information from the one or more tabular regions determined from the one or more tabular data associated with the one or more second images, based on an optical character recognition (OCR) conversion process;

extract one or more second data associated with the one or more financial information from one or more non-tabular regions determined from the one or more non-tabular data associated with the one or more third images, based on the optical character recognition (OCR) conversion process, wherein the extracted one or more second data are configured to provide one or more contexts to the one or more tabular data associated with the one or more second images; and an output subsystem configured to provide an output of at least one of: the one or more first data extracted from the one or more tabular regions and the one or more second data extracted from the one or more non-tabular regions, to one or more second users on a user interface associated with one or more electronic devices.

12. The machine-learning based (ML-based) computing system of claim 11, wherein in converting the one or more formats of the one or more electronic documents into the one or more first images associated with the one or more electronic documents, the document conversion subsystem is configured to:

determine whether the one or more first images indicate one or more visual appearances of the one or more formats of the one or more electronic documents, by parsing one or more contents associated with the one or more electronic documents for interpreting the one or more contents of each page of the one or more electronic documents, wherein the one or more contents comprise at least one of: one or more texts, one or more graphics, and one or more layout elements, associated with the one or more electronic documents; and upon determining whether the one or more first images indicate the one or more visual appearances of the one or more formats of the one or more electronic documents, convert the one or more formats of the one or more contents into the one or more first images associated with the one or more electronic documents.

13. The machine-learning based (ML-based) computing system of claim 11, wherein in classifying, by the convolutional neural network (CNN) based machine learning model, the one or more first images associated with the one or more electronic documents, the page classification subsystem is configured to:

preprocess the one or more first images associated with the one or more electronic documents, wherein preprocessing of the one or more first images comprises at least one of: standardizing the one or more formats of the one or more electronic documents, and resizing the one or more formats of the one or more electronic documents to one or more dimensions;

obtain the preprocessed one or more first images at the convolutional neural network (CNN) based machine learning model, wherein the convolutional neural network (CNN) based machine learning model is a combination of one or more layers comprising at least one of: one or more convolutional layers, one or more pooling layers, one or more batch normalization layers, and one or more dropout layers; and classify the one or more first images associated with the one or more electronic documents as at least one of: the one or more second images comprising the one or more tabular data and the one or more third images comprising the one or more non-tabular data, by processing the preprocessed one or more first images based on the combination of the one or more layers of the convolutional neural network (CNN) based machine learning model.

14. The machine-learning based (ML-based) computing system of claim 13, further comprising a training subsystem configured to train the convolutional neural network (CNN) based machine learning model, wherein in training the convolutional neural network (CNN) based machine learning model, the training subsystem is configured to:

obtain one or more first datasets associated with the one or more first images for training the convolutional neural network (CNN) based machine learning model;

preprocess the one or more first images associated with the one or more electronic documents;

label the one or more first images in the one or more first datasets, as the one or more second images comprising the one or more tabular data, and the one or more third images comprising the one or more non-tabular data;

segment the one or more first datasets into at least one of: one or more first training datasets and one or more first validation datasets;

train the convolutional neural network (CNN) based machine learning model to classify the one or more first images as the one or more second images comprising the one or more tabular data, and the one or more third images comprising the one or more non-tabular data, by:

obtaining the one or more first images and one or more labels corresponding to the one or more first images, at the convolutional neural network (CNN) based machine learning model; and updating one or more first hyperparameters to learn one or more patterns for accurately classifying the one or more first images as the one or more second images comprising the one or more tabular data, and the one or more third images comprising the one or more non-tabular data, based on a root mean square propagation model, wherein the one or more first hyperparameters comprise at least one of: learning rates, batch sizes, and architectural parameters, and wherein the root mean square propagation model is configured to compute one or more first moving averages of one or more first squared gradients of one or more first loss functions to normalize one or more first learning rates for the one or more first hyperparameters during the training of the convolutional neural network (CNN) based machine learning model;

validate the convolutional neural network (CNN) based machine learning model based on the one or more first validation datasets by determining, by the one or more hardware processors, whether at least one of: the convolutional neural network (CNN) based machine learning model learns the one or more patterns and the convolutional neural network (CNN) based machine learning model is having risk of overfitting, based on one or more first metrics comprising accuracy metric and loss metric; and adjust the one or more first hyperparameters to fine-tune the convolutional neural network (CNN) based machine learning model based on one or more first results of validation of the convolutional neural network (CNN) based machine learning model.

15. The machine-learning based (ML-based) computing system of claim 14, wherein the training subsystem is further configured to re-train the convolutional neural network (CNN) based machine learning model over a plurality of time intervals based on one or more first training data, wherein in re-training the convolutional neural network (CNN) based machine learning model over the plurality of first time intervals, the training subsystem is configured to:

receive the one or more first training data over the plurality of first time intervals;

add the one or more first training data with the one or more first training datasets to generate one or more updated first training datasets;

re-train the convolutional neural network (CNN) based machine learning model based on the one or more updated first training datasets; and execute the re-trained convolutional neural network (CNN) based machine learning model in a page classification subsystem to classify the one or more first images as the one or more second images comprising the one or more tabular data, and the one or more third images comprising the one or more non-tabular data.

16. The machine-learning based (ML-based) computing system of claim 11, wherein in determining, by the you only look once (YOLO) architecture based machine learning model, the one or more tabular regions in the one or more tabular data associated with the one or more second images, the table region determining subsystem is configured to:

obtain the one or more second images associated with the one or more electronic documents;

preprocess the one or more second images by resizing the one or more second images;

determine at least one of: a first sized tabular region based on a first convolution stride at a first layer model of the you only look once (YOLO) architecture based machine learning model, a second sized tabular region based on a second convolution stride at a second layer model of the you only look once (YOLO) architecture based machine learning model, and a third sized tabular region based on a third convolution stride at a third layer model of the you only look once (YOLO) architecture based machine learning model;

identify the one or more bounding box coordinates indicating at least one of: the first sized tabular region, the second sized tabular region, and the third sized tabular region, in the one or more tabular data associated with the one or more second images;

generate one or more confidence scores to analyze confidence level of the you only look once (YOLO) architecture based machine learning model on the determination of at least one of: the first sized tabular region, the second sized tabular region, and the third sized tabular region; and apply a non-maximum suppression technique for classifying one or more redundant bounding boxes to determine whether at least one of: the one or more tabular regions are accurate and the one or more tabular regions are non-overlapped.

17. The machine-learning based (ML-based) computing system of claim 11, wherein the training subsystem is further configured to train the you only look once (YOLO) architecture based machine learning model, wherein in training the you only look once (YOLO) architecture based machine learning model, the training subsystem is configured to:

obtain one or more second datasets associated with the one or more second images for training the you only look once (YOLO) architecture based machine learning model;

select one or more features to determine the one or more tabular regions in the one or more tabular data associated with the one or more second images, wherein the one or more features comprise at least one of: one or more patterns, one or more structural information, and one or more visual information, related to the one or more tabular regions;

label the one or more second images by marking the one or more bounding box coordinates indicating one or more locations of the one or more tabular regions in the one or more tabular data associated with the one or more second images;

segment the one or more second datasets into at least one of: one or more second training datasets and one or more second validation datasets;

train the you only look once (YOLO) architecture based machine learning model to determine the one or more tabular regions based on one or more second hyperparameters and weights, wherein the one or more second hyperparameters comprise at least one of: learning rate, rho, momentum, epsilon, centered, name, weight_decay, clipnorm, clipvalue, global_clipnorm, use_ema, ema_momentum, and ema_overwrite_frequency, and wherein the root mean square propagation model is configured to compute one or more second moving averages of one or more second squared gradients of one or more second loss functions to normalize one or more second learning rates for the one or more second hyperparameters during the training of the you only look once (YOLO) architecture based machine learning model;

validate the you only look once (YOLO) architecture based machine learning model based on the one or more second validation datasets by determining whether the you only look once (YOLO) architecture based machine learning model accurately determines the one or more tabular regions based on one or more second metrics, wherein the one or more second metrics comprise at least one of: precision metric, recall metric, and F1-score metric; and adjust the one or more second hyperparameters to fine-tune the you only look once (YOLO) architecture based machine learning model based on one or more second results of validation of the you only look once (YOLO) architecture based machine learning model.

18. The machine-learning based (ML-based) computing system of claim 17, wherein the training subsystem is further configured to re-train the you only look once (YOLO) architecture based machine learning model over a plurality of second time intervals based on one or more second training data, wherein in re-training the you only look once (YOLO) architecture based machine learning model over the plurality of second time intervals, the training subsystem is configured to:

receive the one or more second training data over the plurality of second time intervals;

add the one or more second training data with the one or more second training datasets to generate one or more updated second training datasets;

re-train the you only look once (YOLO) architecture based machine learning model based on the one or more updated second training datasets; and execute the re-trained you only look once (YOLO) architecture based machine learning model in the table region determining subsystem to determine the one or more bounding box coordinates indicating the one or more tabular regions in the one or more tabular data associated with the one or more second images.

19. The machine-learning based (ML-based) computing system of claim 11, wherein in providing the one or more contexts associated with the one or more second data, to the one or more tabular data, the data extraction subsystem is configured to:

split the one or more phrases associated with the one or more second data, into one or more individual words;

preprocess the one or more individual words, wherein preprocessing the one or more individual words comprise at least one of: converting the one or more individual words to lowercases, eliminating one or more common stop words, and removing one or more extraneous data from the one or more individual words;

determine one or more types of tables in the one or more electronic documents by comparing the preprocessed one or more individual words with one or more pre-stored keywords stored in one or more databases, based on content-based keyword search technique; and classify the one or more types of tables in the one or more electronic documents by generating one or more similarity scores based on the comparison of the preprocessed one or more individual words with the one or more prestored keywords, wherein the one or more similarity scores indicate one or more similarities among the one or more prestored keywords to classify the one or more types of tables.

20. A non-transitory computer-readable storage medium having instructions stored therein that when executed by a hardware processor, cause the processor to execute operations of:

receiving one or more electronic documents from one or more data sources comprising at least one of: one or more databases, one or more electronic mails and one or more application programming interfaces, wherein the one or more electronic documents are associated with one or more financial statements comprising at least one of: one or more balance sheets, one or more income statements, and one or more cash flow statements, of one or more first users;

converting one or more formats of the one or more electronic documents into one or more first images associated with the one or more electronic documents;

classifying the one or more first images associated with the one or more electronic documents as at least one of: one or more second images comprising one or more tabular data, and one or more third images comprising one or more non-tabular data, based on a convolutional neural network (CNN) based machine learning model;

determining one or more tabular regions in the one or more tabular data associated with the one or more second images by identifying one or more bounding box coordinates indicating the one or more tabular regions in the one or more tabular data associated with the one or more second images, based on a you only look once (YOLO) architecture based machine learning model;

extracting one or more first data associated with one or more financial information from the one or more tabular regions determined from the one or more tabular data associated with the one or more second images, based on an optical character recognition (OCR) conversion process;

extracting one or more second data associated with the one or more financial information from one or more non-tabular regions determined from the one or more non-tabular data associated with the one or more third images, based on the optical character recognition (OCR) conversion process, wherein the extracted one or more second data are configured to provide one or more contexts to the one or more tabular data associated with the one or more second images; and providing an output of at least one of: the one or more first data extracted from the one or more tabular regions and the one or more second data extracted from the one or more non-tabular regions, to one or more second users on a user interface associated with one or more electronic devices.

\* \* \* \* \*